(12) United States Patent
Shimizu et al.

(10) Patent No.: US 7,115,694 B2
(45) Date of Patent: Oct. 3, 2006

(54) PROPYLENE-BASED POLYMER

(75) Inventors: Fumihiko Shimizu, Kanagawa (JP); Naomasa Sato, Kanagawa (JP); Akira Kuwahara, Mie (JP); Fumiyoshi Yamada, Kanagawa (JP); Akio Tanna, Kanagawa (JP)

(73) Assignee: Mitsubishi Chemical Corporation, Tokyo (JP)

( * ) Notice: Subject to any disclaimer, the term of this patent is extended or adjusted under 35 U.S.C. 154(b) by 110 days.

(21) Appl. No.: 10/650,676

(22) Filed: Aug. 29, 2003

(65) Prior Publication Data

US 2004/0162403 A1    Aug. 19, 2004

Related U.S. Application Data

(63) Continuation of application No. PCT/JP02/08530, filed on Aug. 23, 2002.

(30) Foreign Application Priority Data

| Aug. 24, 2001 | (JP) | ............................. 2001-255197 |
| Dec. 3, 2001 | (JP) | ............................. 2001-368785 |

(51) Int. Cl.
| C08F 110/06 | (2006.01) |
| C08F 210/16 | (2006.01) |
| B32B 27/08 | (2006.01) |

(52) U.S. Cl. ...................... 526/351; 526/348; 526/160; 428/516; 428/500

(58) Field of Classification Search ................ 526/348, 526/351; 428/500, 516
See application file for complete search history.

(56) References Cited

U.S. PATENT DOCUMENTS

| 3,853,969 A | 12/1974 | Kontos |
| 4,335,225 A | 6/1982 | Collette et al. |
| 4,522,982 A | 6/1985 | Ewen |
| 5,278,264 A | 1/1994 | Spaleck et al. |
| 5,665,820 A | 9/1997 | Leistner et al. |
| 5,892,081 A | 4/1999 | Sueling et al. |
| 6,191,232 B1 | 2/2001 | Mitsutani et al. |
| 6,218,558 B1 | 4/2001 | Kato et al. |
| 6,548,603 B1 | 4/2003 | Satou et al. |
| 6,635,733 B1 | 10/2003 | Yahata et al. |
| 6,887,943 B1 | 5/2005 | Onoe et al. |
| 6,906,155 B1 * | 6/2005 | Minami et al. ............. 526/160 |
| 2003/0153686 A1 | 8/2003 | Onoe et al. |
| 2004/0162403 A1 | 8/2004 | Shimizu et al. |

FOREIGN PATENT DOCUMENTS

| EP | 0 537 130 | 4/1993 |
| EP | 0 636 653 | 2/1995 |
| EP | 0 963 996 | 12/1999 |
| JP | 7-188318 | 7/1995 |
| JP | 10-273507 | 10/1998 |
| JP | 11-106392 | 4/1999 |
| JP | 2002-47314 | * 2/2002 |
| WO | WO99/67303 | * 12/1999 |

OTHER PUBLICATIONS

Uozumi et al, "Isospecific Propylene Polymerization Using the $[ArN(Ch_2)_3NAr]TiCl_2/Al(iBu)_3/Ph_3CH(C_6F_5)_4$ Catalyst System in the Presence of Cyclohexene", Macromol. Chem. Phys. 2001, 202, No. 17, pp. 3279-3283.

Collette, et al., "Elastomeric Polypropylenes from Alumina-Supported Tetraalkyl Group IVB Catalysts. 1. Synthesis and Properties of High Molecular Weight Stereoblock Homopolymers," American Chemical Society, Macromolecules, vol. 22, No. 10, 1989, pp. 3851-3858.

Busico, et al., "New Evidence on the Nature of the Active Sites in Heterogeneous Ziegler-Natta Catalysts for Propene Polymerization," American Chemical Society, Macromolecules, 1997, vol. 30, No. 16, pp. 4786-4790.

Derwent Publications, AN 2002-164097, XP-002261223, WO 01/85815, Nov. 15, 2001.

Derwent Publications, AN 1996-439604, XP-002261224, JP 08-217835, Aug. 27, 1996.

Burlant, et al., "Block and Graft Polymers," Reinhold Publishing, N.Y., 1960, pp. 153-154.

Ewen, "Mechanisms of Stereochemical Control in Propylene Polymerizations with Soluble Group 4B Metallocene/Methylalumoxane Catalysts," J. Am. Chem. Soc. vol. 106, No. 21, 1984, pp. 6355-6364.

Coates, "Precise Control of Polyotefin Stereochemistry Using Single-Site Metal Catalysts," Chem. Rev., vol. 100, No. 4, pp. 1223-1226.

Kurata, et al., "Viscosity-Molecular Weight Relationships and Unperturbed Dimensions of Linear Chain Molecules" Polymer Handbook, Third Edition, 1989.

* cited by examiner

*Primary Examiner*—Roberto Rabago
(74) *Attorney, Agent, or Firm*—Oblon, Spivak, McClelland, Maier & Neustadt, P.C.

(57) ABSTRACT

An object of the present invention is to provide a novel propylene-based polymer capable of providing a propylene-based polymer with a good adhesion and coatability. The present invention lies in a propylene-based polymer having a propylene component with several characteristics including a weight-average molecular weight Mw from not smaller than 5,000 to less than 1,000,000 as measured by GPC, and Regio irregular units based on 2,1-inserted propylene monomer and/or 1,3-inserted propylene monomer present in its main chain and the sum of the ratio of regio irregular units based on 2,1-insertion and 1,3-insertion to all propylene insertions not smaller than 0.05%.

19 Claims, No Drawings

PROPYLENE-BASED POLYMER

TECHNICAL FIELD

The present invention relates to a novel propylene-based polymer. More particularly, the present invention relates to a novel propylene-based polymer free of halogen atom such as chlorine and having an excellent adhesion and paintability with respect to a propylene-based polymer base material.

BACKGROUND ART

Propylene polymers and propylene-olefin copolymers are inexpensive and are excellent in mechanical properties, heat resistance, chemical resistance and water resistance and thus have been used in a wide range of fields. For example, it is occasionally practiced to form a coat layer on the surface of a molded product made of a propylene polymer. A propylene-based polymer has no polar groups in its molecule and thus is defective in that it normally has a low polarity and can difficultly undergo coating or adhesion. Accordingly, in order to improve this defect, (1) various approaches such as chemical treatment of the surface of the molded product of propylene-based polymer with a chemical agent or the like and oxidation treatment of the surface of the molded product by corona discharge treatment, plasma treatment, flame treatment or the like have been attempted. However, these approaches not only require a special apparatus but also leave something to be desired in the improvement of coatability or adhesion.

Further, (2) an approach involving the undercoating of the surface of the molded product of propylene-based polymer with a chlorinated polypropylene has been known. The formation of this chlorinated polypropylene coat layer makes it possible to improve the subsequent coatability of the molded product. In other words, since a chlorinated polypropylene is normally soluble in a hydrocarbon solvent such as toluene and xylene, can be easily applied to the molded product, exhibits a good adhesion to a propylene-based polymer which is a base material and has its molecule provided with a polarity derived from carbon-chlorine bond, the coatability and adhesion of a propylene-based polymer can be improved. It has also been known that a modified chlorinated polypropylene obtained from the chlorinated polypropylene by the graft copolymerization of polar monomers has a better effect of improving coatability and adhesion.

However, the chlorinated polypropylene or modified chlorinated polypropylene to be used as an undercoating agent is a resin containing a large amount of chlorine and thus is environmentally undesirable. This is because the use of vinyl chloride resins has recently brought forth a social issue over the harmful matters generated by recycling or incineration thereof. It has been keenly desired to develop substitute resins free of halogen such as chlorine for chlorinated polypropylene as in vinyl chloride resins.

However, no halogen-free propylene-based polymer resins having a good solubility in an organic solvent as well as a good adhesion have heretofore been found.

An object of the present invention is to provide a novel propylene-based polymer which can provide a propylene-based polymer as a base material with a good adhesion and coatability even if it is free of halogen such as chlorine.

DISCLOSURE OF THE INVENTION

In order to develop a resin which can substitute for chlorinated polypropylene or graft-modified chlorinated polypropylene, the present inventors made extensive studies of the mechanism of exhibition of adhesion of chlorinated polypropylene in an attempt to solve the aforementioned problems.

Detailed results of studies of chlorinated isotactic polypropylene (hereinafter referred to as "Cl-iPP") obtained by chlorination of isotactic polypropylene (hereinafter referred to as "iPP") have been reported [Aoki, "Koubunshi (Polymer)", 16, 687, 1967]. This report discloses that Cl-iPP is a resin having crystallinity, Cl-iPP, which is obtained by chlorination of iPP, exhibits a higher adhesion to iPP than chlorinated atactic polypropylene (hereinafter referred to as "Cl-aPP"), which is obtained by chlorination of amorphous actactic polypropylene (hereinafter referred to as "aPP") and Cl-iPP itself exhibits a higher adhesion to iPP when it is obtained by chlorination in suspension than when it is obtained by chlorination of full solution of iPP with a solvent.

This report also discloses that Cl-iPP obtained by chlorination in suspension has chlorine atoms incorporated in iPP molecule in blocked form. Accordingly, it can be presumed that there are present blocks having relatively large and small amounts of chlorine atoms incorporated therein in Cl-iPP main chain and the block having a large amount of chlorine atoms incorporated therein exhibits a high amorphousness caused by the deterioration of microtacticity of iPP due to chlorination while the block having a small amount of chlorine atoms incorporated therein exhibits a high crystallinity based on the inherent structure of iPP. In other words, Cl-iPP is a polymer having a structure having a block having a relatively high crystallinity and a block having a relatively high amorphousness present in main chain.

On the contrary, it is thought that when iPP which is a raw material is chlorinated in the form of full solution with a solvent, Cl-iPP having a peculiar structure having a crystalline block and an amorphous block present in main chain as mentioned above can be difficultly produced because the chlorination reaction can easily proceed relatively uniformly. Taking into account this fact in combination with the difference in adhesion to iPP, it can be presumed that the structure having a crystalline block and an amorphous block present in main chain is one of requirements for the exhibition of a good adhesion.

In this report is also discussed the mechanism of exhibition of adhesion of Cl-iPP to iPP from the crystallographic standpoint of view. In other words, it is disclosed that when the unit cell of Cl-iPP is calculated supposing that the crystalline system of Cl-iPP is monoclinic as in the crystalline system of iPP, it is found that a-axis, c-axis and β show little change with the bonded amount of chlorine but only the length of b-axis increases with the increase of the bonded amount of chlorine. By the way, it is considered that when there is at least a two-dimensional analogy between polymer crystals, an epitaxy is present between polymer crystals [Horio et al, "Summary of 12th Annual Conference of The Society of Polymer Science, Japan", 102, (1963). Since Cl-iPP and iPP are substantially the same in a-axis and c-axis of unit cell, the requirement of two-dimensional analogy, which is an epitaxy condition, is satisfied.

The aforementioned report also gives comparison of electron ray diffraction photograph of thin Cl-iPP film deposited on a monoaxially-oriented iPP film from a solution from before to after 140° C. heat treatment. This comparison shows that there are observed interference of monoaxially oriented iPP and interference of unoriented Cl-iPP before the heat treatment while there is crystalline interference of monoaxially oriented Cl-iPP imposed on crystalline interference of monoaxially oriented iPP after the heat treatment. This fact substantiates the hypothesis that the heat adhesion of Cl-iPP to iPP involves the epitaxial growth of Cl-iPP crystal on iPP crystal. The phenomenon that the heat adhesion of Cl-iPP to iPP involves melting of Cl-iPP followed by recrystallization has been separately confirmed by X-ray diffractometry in the aforementioned report.

Referring to the relationship between the length of b-axis of unit cell of Cl-iPP and the inherent work adhesion A, it is disclosed that regardless of the production conditions of Cl-iPP, the inherent work adhesion A is a function of the length of b-axis and the closer to iPP crystal the length of b-axis is, the greater is the inherent work adhesion, i.e., the higher is the adhesion.

The present inventors made a general consideration of these phenomena. As a result, it was inferred that Cl-iPP undergoes epitaxial growth on iPP as a base material to form a crystal and the nature of adhesion of Cl-iPP to iPP lies in the intermolecular force between Cl-iPP crystal thus formed and iPP crystal of the base material. This consideration gave an idea that when a resin that can satisfy a condition as a factor of adhesion can be designed, a new resin which can substitute for chlorinated polypropylene, i.e., novel resin allowing epitaxy with iPP without halogen atom such as chlorine can be proposed.

These conditions will be listed below.
(1) Structure having a crystalline block and an amorphous block present in main chain.
(2) Structure wherein the block having a high crystallinity in main chain is rich in isotacticity.

Further, when it is intended to improve the use and characteristics of the propylene-based polymer of the present invention, it is necessary that the following conditions be satisfied. In other words,
(3) the molecular weight should be predetermined relatively low.

Since the main use of the propylene-based polymer for which the present invention is intended requires that it be applied to molded iPP product, it is also important that the propylene-based polymer of the present invention has a high solubility in a solvent. The aforementioned requirement (1) is one of requirements for the rise of solubility. In addition, when the requirement (3) is satisfied, a good solubility in a solvent can be expected as well.
(4) Modified resin obtained by graft polymerization of polar groups As a further development of use of the propylene-based polymer of the present invention, a development of a special resin having not only a high adhesion to iPP but also a good adhesion to a material having a polar group such as coating compound is cited. For the purpose of accomplishing this object, the requirement (4) is an extremely useful means.

For the purpose of enhancing the solubility of the propylene-based polymer of the present invention in a solvent,
(5) a relatively small amount of an olefin is copolymerized with a propylene.

As previously mentioned, the main use of the propylene-based polymer for which the present invention is intended requires that it be applied to molded iPP product. Thus, it is also important that the propylene-based polymer of the present invention has a high solubility in a solvent. However, when the propylene-based polymer of the present invention is copolymerized with a small amount of an olefin such as propylene and ethylene, the solubility of the propylene-based polymer of the present invention in a solvent can be enhanced.

The present inventors made extensive studies of solution to the aforementioned problems in the light of the aforementioned idea. As a result, the present invention has been worked out. In other words, the essence of the present invention lies in a propylene-based polymer having a propylene represented by the following characteristics (1) to (3):
(1) The weight-average molecular weight Mw is from not smaller than 5,000 to less than 1,000,000 as measured by GPC;
(2) In $^{13}$C-NMR, peaks derived from the carbon atom in a methyl group in a propylene unit chain formed by head-to-tail bond are observed and, supposing that the chemical shift of the top of a peak assigned to a pentad represented by mmmm is 21.8 ppm, the ratio of the area $S_5$ of the peak having its top at 21.8 ppm to the total area S of peaks appearing within a range of from 19.8 ppm to 22.2 ppm is from not smaller than 10% to not greater than 60%, and, supposing that the area of a peak having its top at 21.5 to 21.6 ppm is $S_6$, the relationship $4+2S_5/S_6>5$ can be established; and
(3) Regio irregular units based on 2,1-inserted propylene monomer and/or 1,3-inserted propylene monomer are present in its main chain and the sum of the ratio of regio irregular units based on 2,1-insertion and 1,3-insertion to all propylene insertions is not smaller than 0.05%.

The inference which has been made by the present inventors to work out the present invention merely helps the understanding of the present invention. The description in the inference does not limit the present invention.

BEST MODE FOR CARRYING OUT THE INVENTION

The present invention will be further described hereinafter.

One of the main points of the present invention is that the propylene-based polymer of the present invention is substantially free of halogen, particularly chlorine. In the related art technique, it has been practiced to chlorinate a propylene polymer to have a good adhesion as in Cl-iPP. In the present invention, however, a certain amount of a crystalline block is allowed to be present in the main chain of an adhesive resin on the basis of the inference that the closer to b-axis of unit cell of iPP as a base material the length of b-axis of unit cell of the adhesive resin applied is, the better is the adhesion exhibited, from the standpoint of the fact that the nature of adhesion of the resin applied to iPP as a base material lies in the epitaxial growth of the resin on the base material and the intermolecular force between the iPP crystal of the base material and the resin crystal, thereby providing adhesion without introducing chlorine. In general, the introduction of chlorine causes the length of b-axis to increase. However, since the present invention does not involve the introduction of chlorine, it is thought that the isotactic block having a high crystallinity has basically the same structure as that of iPP. Thus, a structure which is very analogous to iPP from the standpoint of the length of b-axis is developed. Accordingly, the resin of the present invention can be expected to have a better adhesion than the related art Cl-iPP does.

The propylene-based polymer of the present invention comprises propylenes represented by the aforementioned characteristics (1) to (3). In some detail, there are a polymer comprising a propylene as a monomer and a copolymer comprising a propylene as a main monomer and an olefin as a comonomer. The propylene-olefin copolymer is preferably a propylene-ethylene copolymer which may have a small amount (less than 5 mol-%) of a comonomer other than ethylene present in the main chain so far as the essence of the present invention is not impaired.

The first characteristic of the propylene-based polymer of the present invention is that it has a predetermined molecular weight. In other words, the molecular weight is from not smaller than 5,000 to less than 1,000,000 as calculated in terms of weight-average molecular weight Mw measured by GPC (Gel Permeation Chromatography). When Mw falls below 5,000, the film-forming properties of the coat layer formed by applying the polymer to a base material becomes remarkably deteriorated and remarkably sticky to disadvantage. Further, when Mw is not smaller than 1,000,000, there are no serious problems of film-forming properties and stickiness, but the viscosity of the polymer dissolved in a solvent is too high, causing inconvenience in production or handling of polymer solution to disadvantage. The polymer of the present invention has a weight-average molecular weight Mw of from not smaller than 5,000 to less than 1,000,000, preferably from not smaller than 10,000 to less than 500,000, more preferably from not smaller than 30,000 to less than 300,000. The propylene-based polymer according to the present invention exhibits a good solubility in a hydrocarbon-based solvent. In particular, when the weight-average molecular weight Mw is predetermined to be a range of from not smaller than 5,000 to less than 200,000, it can be preferably used as a solvent-soluble coating compound material or aqueous dispersible coating compound material. Further, when the weight-average molecular weight Mw is not smaller than 200,000, it still exhibits a good solubility in a hydrocarbon-based solvent. In addition, by making the use of a high cohesive force based on the high molecular weight, it can be used as an aqueous dispersible coating compound material more preferably.

In the present invention, the measurement of molecular weight by GPC is effected in the following manner.

Firstly, 20 mg of a sample is measured out in a 30 ml vial. To the sample is then added 20 g of an orthodichlorobenzene containing 0.04% by weight of BHT as a stabilizer. The sample is then dissolved over an oil bath which has been heated to 135° C. The sample solution is subjected to thermal filtration through a PTFE (polytetrafluoroethylene) filter having a pore diameter of 3 μm to prepare a sample solution having a polymer concentration of 0.1% by weight. Subsequently, the sample solution is subjected to GPC measurement using TSKgel GMH-HT (30 cm×4) and GPC 150CV equipped with RI detector produced by Waters Inc. as columns. Referring to the measurement conditions, the injected amount of sample solution is 500 μl, the column temperature is 135° C., the solvent is orthodichlorobenzene, and the flow rate is 1.0 ml/min. For the calculation of molecular weight, a commercially available monodisperse polystyrene is used as a standard sample. A correction curve on retention time and molecular weight is prepared from the viscosity equation of the standard polystyrene sample and polypropylene. The molecular weight of the propylene-based polymer is then calculated. As the viscosity equation there is used $[\eta]=K\cdot M^{\alpha}$. For polystyrene, K of 1.38E–4 and α of 0.70 are used. For the propylene-based polymer, K of 1.03E–4 and α of 0.78 are used.

The distribution of molecular weight of the propylene-based polymer of the present invention is not specifically limited. However, an excessively wide distribution of molecular weight should be avoided because it means that the content of low molecular components is naturally great. In the case where as an index of distribution of molecular weight there is used a ratio Mw/Mn of weight-average molecular weight Mw to number-average molecular weight Mn, a propylene-based polymer having Mw/Mn of preferably smaller than 20, more preferably smaller than 10, most preferably smaller than 6 can be preferably used.

The second characteristic of the propylene-based polymer of the present invention is that there are a block having a high crystallinity and a block having a high amorphousness present in main chain and the block having a high crystallinity has a structure rich in isotacticity. However, when the content of the block having a high crystallinity is too great, the solubility in a solvent is deteriorated. Thus, it is important that the block having a high crystallinity and the block having a high amorphousness are well balanced. In the present invention, as one of indices of this balance there is used a requirement defined by $^{13}$C-NMR spectrum.

The method for measuring $^{13}$C-NMR spectrum in the present invention is as follows.

A sample in an amount of from 350 to 500 mg is completely dissolved in about 2.2 ml of orthodichlorobenzene in a sample tube for NMR having 10 mmφ. Subsequently, to the solution is added about 0.2 ml of benzene deuteride as a locking solvent to cause uniformalization. The sample is then subjected to measurement at 130° C. by a proton complete decoupling method. The measurement conditions are flip angle of 90° and a pulse interval of not smaller than $5T_1$ ($T_1$ is the longest value in the spin lattice relaxation time of methyl group). In a propylene-based polymer, the spin lattice relaxation time of methylene group and methine group is shorter than that of methyl group. Thus, under these measurement conditions, the recovery of magnetization of all carbon atoms is not smaller than 99%. In order to enhance the precision in quantitative determination, it is preferred that an NMR apparatus having 125 MHz or higher as a resonance frequency of $^{13}$C nucleus be used to effect integration for 20 hours or longer.

Referring to chemical shift, the absolute position of all methyl branch among 10 pentads (mmmm, mmmr, rmmr, mmrr, mmrm, rmrr, rmrm, rrrr, rrrm) in a propylene unit chain formed by head-to-tail bond are the same. In other words, the chemical shift of top of peak based on methyl group at the third unit in 5 chains of propylene unit represented by mmmm is predetermined to be 21.8 ppm. With this chemical shift as a reference, the chemical shift of top of other peaks are determined. With this reference, the chemical shift of top of peaks based on methyl group at the third unit in the case of 5 chains of other propylene units are generally as follows. In some detail, the chemical shift of mmmr, rmmr, mmrr, mmrm, rmrr, rmrm, rrrr, rrrm, and mrrm are from 21.5 to 21.7 ppm, from 21.3 to 21.5 ppm, from 21.0 to 21.1 ppm, from 20.8 to 21.0 ppm, from 20.6 to 20.8 ppm, from 20.3 to 20.5 ppm, from 20.1 to 20.3 ppm, and from 19.9 to 20.1 ppm, respectively. It is necessary that assignment be conducted paying attention to the fact that the chemical shift of peaks derived from these pentads show some change with NMR measurement conditions and the peaks are not necessarily single peaks and occasionally show a complicated split pattern based on microstructure.

The propylene-based polymer of the present invention satisfies the following requirements defined by $^{13}$C-NMR spectrum. In some detail, in $^{13}$C-NMR, peaks derived from the carbon atom in a methyl group in a propylene unit chain formed by head-to-tail bond are observed and, supposing that the chemical shift of the top of a peak assigned to a pentad represented by mmmm is 21.8 ppm, the ratio of the area $S_5$ of the peak having its top at 21.8 ppm to the total area S of peaks appearing within a range of from 19.8 ppm to 22.2 ppm is from not smaller than 10% to not greater than 60%, and, supposing that the area of a peak having its top at 21.5 to 21.6 ppm is $S_6$, the relationship $4+2S_5/S_6>5$ can be established.

These requirements are related to the fact that the propylene-based polymer of the present invention has a block having a high crystallinity and a block having a high amorphousness present in its main chain and the block having a high crystallinity has a structure rich in isotacticity. When the ratio of $S_5$ to S falls below 10%, the resulting propylene-based polymer exhibits too low a crystallinity to have a sufficient adhesion and brings forth a problem of stickiness, etc. to disadvantage. On the contrary, when the ratio of $S_5$ to S exceeds 60%, the resulting propylene-based polymer exhibits too high a crystallinity and hence a deteriorated solubility in a solvent to disadvantage. The ratio of $S_5$ to S defined in the present invention is from not smaller than 10% to not greater than 60%, more preferably from not smaller than 15% to not greater than 55%, even more preferably from not smaller than 20% to not greater than 50%.

The aforementioned relationship of $4+2S_5/S_6>5$ is closely related to the index named isotactic block index (BI) by Waymouth et al (see JP-T-9-510745). BI is an index representing the stereoblock properties of a polymer and can be defined by the equation BI=4+2[mmmm]/[mmmr]. In some detail, BI represents the average chain length of an isotactic block having four or more propylene units (J. W. Collete et al., Macromol., 22, 3858 (1989); J. C. Randall, J. Polym. Sci. Polym. Phys. Ed., 14, 2083 (1976)). In the case of a statistically complete atactic polypropylene, BI is 5. Accordingly, the fact that BI (=4+2[mmmm]/[mmmr]) is greater than 5 means that the average chain length of the isotactic block contained in the polymer is longer than that of the atactic polypropylene.

The term $(4+2S_5/S_6)$ concerning the requirements of the present invention is not completely the same as BI mentioned above but generally corresponds to BI. Thus, the requirement of $4+2S_5/S_6>5$ means that the polymer of the present invention differs from the atactic polypropylene and contains an isotactic block having a chain length that allows crystallization. The fact that an isotactic block is present means that the main chain also has a block formed by a sequence having a disturbed isotacticity present therein. Further, since the propylene-olefin copolymer contains an olefin as a comonomer, a block having a crystallinity deteriorated by the olefin is present as well.

Thus, in the propylene-based polymer of the present invention, a peculiar structure having a crystalline block and an amorphous block present in its main chain wherein the crystalline block has a structure formed by an isotactic block having a relatively long average chain length and rich in isotacticity is realized as previously mentioned.

In the present invention, the term $4+2S_5/S_6$ may be greater than 5, preferably from greater than 5 to less than 50, more preferably from greater than 6 to less than 30.

Examples of the method for controlling $S_5$ and $S_6$ within the range defined by the requirements of the present invention include (i) a method which comprises controlling by the structure of the polymerization catalyst, (ii) a method which comprises controlling by the polymerization temperature, (iii) a method which comprises controlling by the monomer concentration, etc. The dependence of $S_5$ and $S_6$ on temperature and monomer concentration varies with the catalyst used and thus cannot be unequivocally defined. Accordingly, it is important that these conditions be controlled on the basis of the properties of the catalyst used. The method which comprises controlling by the structure of the polymerization catalyst will be described later.

Further examples of requirements characterizing the propylene-based polymer of the present invention include a requirement concerning the regio irregular units of propylene monomer, i.e., requirement that regio irregular units based on 2,1-inserted propylene monomer and/or 1,3-inserted propylene monomer be present in its main chain and the sum of the ratio of regio irregular units based on 2,1-insertion and 1,3-insertion to all propylene insertions be not smaller than 0.05%.

The polymerization of propylene normally proceeds with 1,2-insertion by which methylene group is connected to the active site of catalyst but rarely with 2,1-insertion or 1,3-insertion. The propylene monomer having 2,1-insertion in propylene chain forms regio irregular units represented by the following partial structures (I) and (II). Thus, the structure having both the partial structures (I) and (II) present in main chain is one of the characteristics of the propylene-based polymer of the present invention. Further, the propylene monomer having 1,3-insertion in propylene chain forms a regio irregular unit represented by the following partial structure (III) in the main chain of the polymer.

Alternatively, the structure (partial structure (IV)) having 2,1-insertion of propylene followed by the insertion of an olefin such as ethylene which is followed by normal 1,2-insertion of propylene is one of the characteristics of the propylene-based polymer of the present invention.

Partial Structure (I)

Partial Structure (II)

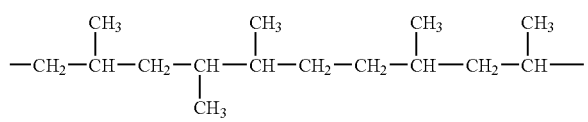

Partial Structure (III)

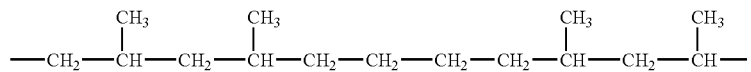

Partial Structure (IV)

In the present invention, the ratio of 2,1-inserted propylene to all propylene insertions and the ratio of 1,3-inserted propylene to all propylene insertions are calculated by the following equations.

(i) In the Case of Propylene Monomer $$\text{Ratio of 2,1-insertion} = \frac{\sum I(14.5 - 18.9)/2}{\sum I(CH_3)}$$

$$\text{Ratio of 1,3-insertion} = \frac{\sum I(27.5 - 28.0)/2}{\sum I(CH_3)}$$

In these equations, $\Sigma I(x-y)$ represents the sum of integrated intensity of signals appearing within the range of from x ppm to y ppm in $^{13}$C-NMR spectrum and $\Sigma I(CH_3)$ represents the sum of integrated intensity of signals derived from all methyl groups except the terminals. This can be determined by the following equation.

$\Sigma I(CH_3) = \Sigma I(14.5-18.0) + \Sigma I(19.5-24.4) + \Sigma I(27.5-28.0)/2$ The signals appearing within the range of from 14.5 to 18.0 ppm are derived from the carbon atoms in methyl group in 2,1-inserted propylene, and the signals appearing within the range of from 19.5 to 24.4 ppm are derived from the carbon atoms in methyl group in 1,2-inserted propylene. Further, the signals appearing within the range of from 27.5 to 28.0 ppm are derived from two methylene carbon atoms in 1,3-inserted propylene.

(ii) In the Case of Propylene-ethylene Copolymer $$\% \text{ 2,1-Insertion} = \frac{\sum I(14.2 - 18.0) + \sum I(33.5 - 34.2)}{\sum I(14.2 - 23.5) + \left[\sum I(27.5 - 28.0)\right]/2} \times 100$$

$$\% \text{ 1,3-Insertion} = \frac{\sum I(27.5 - 28.0)/2}{\sum I(14.2 - 23.5) + \left[\sum I(27.5 - 28.0)\right]/2} \times 100$$

In these equations, $\Sigma I(x-y)$ represents the sum of integrated intensity of signals appearing within the range of from x ppm to y ppm in $^{13}$C-NMR spectrum as mentioned above.

The signals appearing within the range of from 14.2 to 18.0 ppm are derived from the carbon atoms in methyl group in 2,1-inserted propylene, and the signals appearing within the range of from 33.5 to 34.2 ppm are derived from the carbon atoms in methyl group in 2,1-inserted propylene in the structure of $^r$PEP. P represents propylene, $^r$P represents 2,1-inserted propylene, and E represents ethylene. The signals appearing within the range of from 14.2 to 23.5 ppm are derived from the carbon atoms in methyl group in 1,2-inserted and 2,1-inserted propylenes, and the signals appearing within the range of from 27.5 to 28.0 ppm are derived from two methylene carbon atoms in 1,3-inserted propylene.

To be strict, the signals of carbon atoms in the methyl group in 2,1-inserted propylene derived from other structures, e.g., $^r$PE$^r$P, $^r$PEE and E$^r$PE need to be taken into account. However, since the propylene-based polymer of the present invention contains a relatively small amount of 2,1-insertion as compared with 1,2-insertion, the signals derived from these structures are negligible.

Such a regio irregular unit normally deteriorates the crystallinity of a polymer and thus acts to enhance the solubility of a polymer in a solvent in the present invention. As another method for deteriorating the crystallinity of the propylene-based polymer there may be used a method which comprises deteriorating the stereoregularity of methyl group. In general, however, when a polymer obtained by this method is applied to a base material to form a coat layer, a tendency is given that the stickiness of the coat layer becomes remarkable to disadvantage in application. Further, when the stereoregularity of methyl group is raised in an attempt to inhibit the stickiness of the coat layer, the solubility in a solvent is deteriorated, giving a tendency that the smoothness of the coat layer is impaired to disadvantage in application. Thus, taking into account the solubility in a solvent and the properties of the coat layer, a structure properly having regio irregular units in main chain is desirable from the standpoint of balance of the two properties.

In the present invention, regio irregular units based on at least any of 2,1-inserted propylene monomer and 1,3-inserted propylene monomer are present in the main chain, and the sum of the ratios of regio irregular units based on 2,1-insertion and 1,3-insertion to all propylene insertions is normally not smaller than 0.05%, preferably not smaller than 0.1%, more preferably not smaller than 0.5%. Further, the sum of the ratios of regio irregular units based on 2,1-insertion and 1,3-insertion to all propylene insertions is normally not greater than 5%, preferably not greater than 4.5%, more preferably not greater than 4%.

A propylene-based polymer having regio irregular units based on both 2,1-inserted propylene monomer and 1,3-inserted propylene monomer present in the main chain is advantageous in that it can deteriorate crystallinity more effectively to enhance the solubility in a solvent. Further, when the ratio of regio irregular units based on 1,3-insertion is greater than that of regio irregular units based on 2,1-insertion, it gives good general physical properties, including solubility in a solvent and physical properties of coat layer, to further advantage.

Examples of the method for controlling the amount of 2,1-insertion and/or 1,3-insertion in the main chain include (i) a method which comprises controlling by the structure of the polymer catalyst, (ii) a method which comprises controlling by the polymerization temperature, (iii) a method which comprises controlling by the monomer concentration, (iv) a method which comprises controlling by the hydrogen concentration during polymerization, etc. The dependence of the amount of 2,1-insertion and/or 1,3-insertion on the temperature, the monomer concentration and the hydrogen concentration varies with the catalyst used and thus cannot be unequivocally defined. Accordingly, it is important to control these conditions on the basis of the properties of the catalyst used. The method which comprises controlling by the structure of the polymerization catalyst will be described later.

The propylene-olefin copolymer in the propylene-based polymer according to the present invention satisfies the following requirements defined by $^{13}$C-NMR spectrum to exhibit a better solubility in a solvent and no stickiness. In other words, in $^{13}$C-NMR spectrum, peaks derived from the carbon atom in a methyl group in a propylene unit chain formed by head-to-tail bond are observed and, supposing that the chemical shift of the top of a peak assigned to a pentad represented by mmmm is 21.8 ppm and the integrated intensity of peaks appearing at from 24.5 ppm to 25.0 ppm, from 33.5 ppm to 34.2 ppm, from 14.2 ppm to 23.5 ppm and from 27.5 ppm to 28.0 ppm are $S_1$, $S_2$, $S_3$ and $S_4$, respectively, the following relationship can be established:

$0 < (S_1+S_2)/(S_1+S_2+S_3 0.5 S_4) < 0.05$

The aforementioned requirement is closely related to the content of olefin in the propylene-based polymer of the present invention. The aforementioned requirement will be further described with reference to propylene-ethylene copolymer. Propylene is represented by P, 2,1-inserted propylene is represented by 'P, and ethylene is represented by E. In the case where most of ethylene is present in the form of PEP, 'PE'P or PE'P in the main chain of the propylene-based polymer of the present invention, $(S_1+S_2)/(S_1+S_2+S_3 0.5S_4)$ can be said to be ethylene fraction in the copolymer. Accordingly, the aforementioned requirement means that the content of ethylene in the propylene-based polymer of the present invention is relatively small. In particular, in the case where most of ethylene is present in the form of PEP, 'PE'P or PE'P in the main chain of the propylene-based polymer of the present invention, it means that the ethylene content falls below 5 mol-%.

In the present invention, when the propylene unit is represented by P, the 2,1-inserted propylene unit is represented by 'P, and the ethylene unit is represented by E, it is preferred that no partial structures represented by PEE, 'PEE, EEE, EPE and E'PE are present or the content of the partial structures is not greater than 3% of that of all triads formed by P, 'P and E.

PEE or 'PEE has a peak at 27.3 ppm and EEE has a peak at 30.0 ppm. Further, since EPE or E'PE has a peak at 33.5 ppm, the proportion of presence of the partial structures can be calculated on the basis of the integrated intensity of these peaks. Since the chemical shift in $^{13}$C-NMR shows a delicate change with measurement conditions, this point needs to be taken into account.

The requirement that no partial structures represented by PEE, 'PEE, EEE, EPE and E'PE be present or the content of the partial structures be not greater than 3% of that of all triads formed by P, 'P and E means that ethylene is present in the form of PEP (or 'PE'P) or 'PEP in the polymer of the present invention and two ethylene groups are not inserted continuously, that is, the randomness of ethylene is high. Thus, when the randomness of ethylene is high, the crystallinity of the polymer can be lowered more effectively.

As the method for controlling $S_1$ to $S_4$ to satisfy the relationship $0<(S_1+S_2)/(S_1+S_2+S_3 0.5S_4)<0.05$, the controlling of the ratio of propylene to ethylene to be used in the polymerization is most practical. The specific ratio of propylene to ethylene varies with the catalyst used and thus cannot be unequivocally defined. However, by making the use of the relationship between the ratio of propylene to ethylene to be used in the polymerization and $(S_1+S_2)/(S_1+S_2+S_3+0.5S_4)$ which has been previously determined under desired conditions such as temperature and pressure, $(S_1+S_2)/(S_1+S_2+S_3 0.5S_4)$ can be controlled to a desired value.

In the case where $(S_1+S_2)/(S_1+S_2+S_3 0.5S_4)$ is not smaller than 0.05, the solubility of the resin in a solvent is enhanced, but the resin tends to become remarkably sticky.

In the present invention, $(S_1+S_2)/(S_1+S_2+S_3+0.5S_4)$ may be from greater than 0 to less than 0.05, preferably from greater than 0 to less than 0.03.

The method for producing the propylene polymer of the present invention is arbitrary so far as it can produce a polymer which can satisfy the requirements of the present invention. Preferred examples of the production method include a production method involving the use of a single site catalyst. The reason is that a single site catalyst normally can control microtacticity by design of ligands, give a sharp distribution of molecular weight or stereoregularity and produce easily a polymer having a relatively low molecular weight. As such a single site catalyst which can produce the polymer of the present invention there may be used a metallocene catalyst or a so-called post-metallocene catalyst. The term "metallocene catalyst" as used herein is meant to indicate a catalyst containing a transition metal compound having a cyclopentadienyl ligand. The term "post-metallocene catalyst" as used herein is meant to indicate a catalyst containing a transition metal compound having a ligand having a hetero atom such as nitrogen, oxygen and phosphorus rather than cyclopentadienyl ligand. These catalysts are compounds which are normally called co-catalysts and are normally used in combination with a compound capable of activating these transition metals. Among these catalysts, the metallocene catalyst can be preferably used because it can precisely control microtacticity.

The metallocene catalyst is preferably a $C_1$-symmetrical ansa-metallocene containing a bridging group. A non-bridged metallocene, too, can be used to produce the propylene-based polymer of the present invention. In general, however, the ansa-metallocene having a bridging group has a better thermal stability than the non-bridged metallocene and thus is desirable particularly from the industrial standpoint of view.

The ansa-metallocene having a bridging group which can be preferably used in the present invention is a bridged $C_1$-symmetrical metallocene of a transition metal compound of the group 4 having conjugated 5-membered ring ligands. Such a transition metal compound is known and it is known that the transition metal compound is used as an olefin polymerization catalyst component.

The metallocene which is preferably used to produce the propylene-based polymer of the present invention is a $C_1$-symmetrical compound represented by the general formula: $Q(C_5H_{4-a}R^2_a)(C_5H_{4-b}R^3_b)MXY$. Alternatively, a plurality of metallocenes represented by the aforementioned general formula may be used in admixture.

The metallocene having the aforementioned general formula will be further described hereinafter. In the aforementioned general formula, Q represents a bond group bridging two conjugated 5-membered ring ligands, M represents a transition metal atom selected from the group 4 of the periodic table, and X and Y each independently represents a hydrogen atom, halogen atom, $C_1$–$C_{20}$ hydrocarbon group, $C_1$–$C_{20}$ oxygen-containing hydrocarbon group, $C_1$–$C_{20}$ nitrogen-containing hydrocarbon group, $C_1$–$C_{20}$ phosphorus-containing hydrocarbon group or $C_1$–$C_{20}$ silicon-containing hydrocarbon group, and $R^2$ and $R^3$ each independently represents a $C_1$–$C_{20}$ hydrocarbon group, halogen atom, $C_1$–$C_{20}$ halogen-containing hydrocarbon group, alkoxy group, aryloxy group, silicon-containing hydrocarbon group, phosphorous-containing hydrocarbon group, nitrogen-containing hydrocarbon group or boron-containing hydrocarbon group. Further, two adjacent $R^2$'s and/or $R^3$'s may be connected to each other to form a 4- to 10-membered ring. The suffixes a and b each independently is an integer satisfying the relationships $0 \leq a \leq 4$ and $0 \leq b \leq 4$.

Specific examples of the bond group Q bridging between two conjugated 5-membered ring ligands will be given below. In some detail, there are alkylene groups such as methylene group and ethylene group, alkylidene groups such as ethylidene group, propylidene group, isopropylidene group, phenylmethylidene group and diphenylmethylidene group, silicon-containing bridging groups such as dimethylsilylene group, diethylsilylene group, dipropylsilylene group, diphenylsilylene group, methylethylsilylene group, methylphenylsilylene group, methyl-t-butylsilylene group, disilylene group and tetramethyldisilylene group, germanium-containing bridging groups such as dimethylgermylene group, diethylgermylene group, diphenylgermylene group and methylphenylgermylene group, alkylphosphine, amine, etc. Among these groups, alkylene group, alkylidene group, silicon-containing bridging group and germanium-containing bridging group are particularly preferably used.

In the aforementioned general formula, $R^2$ and/or $R^3$ represents a $C_1$–$C_{20}$ hydrocarbon group which may be substituted such as methyl group, ethyl group, n-propyl group, isopropyl group, n-butyl group, isobutyl group, t-butyl group, n-pentyl group, isopentyl group, cyclopentyl group, hexyl group, cyclohexyl group, heptyl group, octyl group, nonyl group, decyl group, phenyl group, t-butylphenyl group and naphthyl group, a $C_1$–$C_{20}$ hydrocarbon group which may have halogen such as fluoromethyl group, fluoroethyl group, fluorophenyl group, fluoronaphthyl group, fluorobiphenyl group, chloromethyl group, chloroethyl group, chlorophenyl group, chloronaphthyl group and chlorobiphenyl group, a halogen atom such as fluorine, chlorine, bromine and iodine, an alkoxy group such as methoxy group, ethoxy group, propoxy group and butoxy group, an aryloxy group such as phenoxy group, methylphenoxy group and pentamethylphenoxy group, a silicon-containing hydrocarbon group such as trimethylsilyl group, triethylsilyl group and triphenylsilyl group, a phosphorus-containing hydrocarbon group, a nitrogen-containing hydrocarbon group or a boron-containing hydrocarbon group.

When there are a plurality of $R^2$'s, they may be the same or different. Further, when two $R^2$'s are present on adjacent carbon atoms in the cyclopentadienyl ring, they may be bonded to each other to form a 4- to 10-membered ring such as indenyl group, tetrahydroindenyl group, fluorenyl group, octahydrofluorenyl group, azulenyl group and hexahydroazulenyl group. Similarly, when there are a plurality of $R^3$'s, they may be the same or different. Further, when two $R^3$'s are present on adjacent carbon atoms in the cyclopentadienyl ring, they may be bonded to each other to form a 4- to 10-membered ring such as indenyl group, tetrahydroindenyl group, fluorenyl group, octahydrofluorenyl group, azulenyl group and hexahydroazulenyl group. In the present invention, since the metallocene represented by the general formula: $Q(C_5H_{4-a}R^2{}_a)(C_5H_{4-b}R^3{}_b)MXY$ merely needs to have $C_1$-symmetry, $R^2$ and $R^3$ may be the same or different so far as $C_1$-symmetry is maintained.

M is a transition metal of the group 4 of the periodic table such as titanium, zirconium and hafnium, preferably zirconium or hafnium.

X and Y each represents a hydrogen atom, halogen atom, $C_1$–$C_{20}$, preferably $C_1$–$C_{10}$ hydrocarbon group, $C_1$–$C_{20}$, preferably $C_1$–$C_{10}$ alkoxy group, alkylamide group, $C_1$–$C_{20}$, preferably $C_1$–$C_{12}$ phosphorus-containing hydrocarbon group, $C_1$–$C_{20}$, preferably $C_1$–$C_{12}$ silicon-containing hydrocarbon group or the like. X and Y may be the same or different. Preferred among these groups are halogen atom, hydrocarbon group and alkylamide group.

When M is zirconium, specific examples of the transition metal compound include:

(1) Dichloro[dimethylsilylene(cyclopentadienyl)(2-methyl-1-indenyl)zirconium]
(2) Dichloro[dimethylsilylene(cyclopentadienyl)(2,4-dimethyl-1-indenyl)zirconium]
(3) Dichloro[dimethylsilylene(cyclopentadienyl)(2-methyl-4-phenyl-1-indenyl)zirconium]
(4) Dichloro[dimethylsilylene(cyclopentadienyl)(2-methyl-4-isopropyl-1-indenyl)zirconium]
(5) Dichloro[dimethylsilylene(9-fluorenyl)(2,4-dimethyl-1-indenyl)zirconium]
(6) Dichloro[dimethylsilylene(cyclopentadienyl)(2-ethyl-4-methyl-1-indenyl)zirconium]
(7) Dichloro[dimethylsilylene(cyclopentadienyl)(2-ethyl-4-phenyl-1-indenyl)zirconium]
(8) Dichloro[ethylene(cyclopentadienyl)(2-methyl-1-indenyl)zirconium]
(9) Dichloro[ethylene(cyclopentadienyl)(2,4-dimethyl-1-indenyl)zirconium]
(10) Dichloro[ethylene(cyclopentadienyl)(2-methyl-4-phenyl-1-indenyl)zirconium]
(11) Dichloro[ethylene(cyclopentadienyl)(2-methyl-4-isopropyl-1-indenyl)zirconium]
(12) Dichloro[ethylene(9-fluorenyl)(2,4-dimethyl-1-indenyl)zirconium]
(13) Dichloro[ethylene(cyclopentadienyl)(2-ethyl-4-methyl-1-indenyl)zirconium]
(14) Dichloro[ethylene(cyclopentadienyl)(2-ethyl-4-phenyl-1-indenyl)zirconium]
(15) Dichloro[dimethylsilylene(cyclopentadienyl)(2-methyltetrahydro-1-indenyl)zirconium]
(16) Dichloro[dimethylsilylene(cyclopentadienyl)(2,4-dimethyltetrahydro-1-indenyl)zirconium]
(17) Dichloro[dimethylsilylene(cyclopentadienyl)(2-methyl-4-phenyltetrahydro-1-indenyl)zirconium]
(18) Dichloro[dimethylsilylene(cyclopentadienyl)(2-methyl-4-isopropyltetrahydro-1-indenyl)zirconium]
(19) Dichloro[dimethylsilylene(2-methyl-1-cyclopentadienyl)(2,4-dimethyltetrahydro-1-indenyl)zirconium]
(20) Dichloro[dimethylsilylene(cyclopentadienyl)(2-ethyl-4-methyltetrahydro-1-indenyl)zirconium]
(21) Dichloro[dimethylsilylene(cyclopentadienyl)(2-ethyl-4-phenyltetrahydro-1-indenyl)zirconium]
(22) Dichloro[ethylene(cyclopentadienyl)(2-methyltetrahydro-1-indenyl)zirconium]
(23) Dichloro[ethylene(cyclopentadienyl)(2,4-dimethyltetrahydro-1-indenyl)zirconium]
(24) Dichloro[ethylene(cyclopentadienyl)(2-methyl-4-phenyltetrahydro-1-indenyl)zirconium]
(25) Dichloro[ethylene(cyclopentadienyl)(2-methyl-4-isopropyltetrahydro-1-indenyl)zirconium]
(26) Dichloro[ethylene(9-fluorenyl)(2,4-dimethyltetrahydro-1-indenyl)zirconium]
(27) Dichloro[ethylene(cyclopentadienyl)(2-ethyl-4-methyltetrahydro-1-indenyl)zirconium]
(28) Dichloro[ethylene(cyclopentadienyl)(2-ethyl-4-phenyltetrahydro-1-indenyl)zirconium]

As compounds of other transition metals belonging to the group 4 such as titanium compound and hafnium compound there may be used compounds similar to those listed above. A mixture of a plurality of these compounds having different structures may be used. Further, a known solid catalyst mainly composed of titanium trichloride or a carrier-supported catalyst containing magnesium, titanium or halogen as an essential component may be auxiliarily used.

The transition metal compound which is particularly preferably used is a compound represented by the following general formula (I) having $C_1$-symmetry:

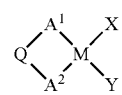

(I)

In the general formula (I), $A_1$ and $A_2$ each represents a conjugated 5-membered ring ligand, at least one of $A^1$ and $A^2$ has a 7- to 10-membered condensed ring formed by connecting adjacent substituents on the conjugated 5-membered ring ligand with two atoms on the 5-membered ring included, Q represents a bond group bridging two conjugated 5-membered ring ligands at arbitrary position, M represents a transition metal atom selected from the group 4 of the periodic table, and X and Y each independently represents a hydrogen atom, halogen atom, hydrocarbon group, alkylamide group, halogenated hydrocarbon group, oxygen-containing hydrocarbon group, nitrogen-containing hydrocarbon group, phosphorus-containing hydrocarbon group, silicon-containing hydrocarbon group or sulfur-containing group to be connected to M.

Representative examples of the aforementioned conjugated 5-membered ring ligand include cyclopentadienyl group which may have substituents. Specific examples of the aforementioned substituents include a hydrocarbon group having normally from 1 to 20, preferably from 1 to 15 carbons. Examples of such a hydrocarbon group include methyl group, ethyl group, n-propyl group, isopropyl group, n-butyl group, t-butyl group, isobutyl group, pentyl group, cyclopentyl group, hexyl group, cyclohexyl group, octyl group, phenyl group, naphthyl group, butenyl group, butadienyl group, triphenylcarbyl group, etc.

Examples of substituents other than the aforementioned hydrocarbon groups include hydrocarbon residues containing atoms such as silicon, oxygen, nitrogen, phosphorus, boron and sulfur. Representative examples of these hydrocarbon residues include methoxy group, ethoxy group, phenoxy group, furyl group, trimethylsilyl group, diethylamino group, diphenylamino group, pyrazolyl group, indolyl group, carbazolyl group, dimethylphosphino group, diphenylphosphino group, diphenylboron group, dimethoxyboron group, chenyl group, etc.

Other examples of these substituents include halogen atom, halogen-containing hydrocarbon group, etc. Representative examples of these substituents include chlorine, bromine, iodine, fluorine, trichloromethyl group, chlorophenyl group, chlorobiphenyl group, chloronaphthyl group, trifluoromethyl group, fluorophenyl group, fluorobiphenyl group, fluoronaphthyl group, pentafluorophenyl group, etc.

As previously mentioned, at least one of $A_1$ and $A_2$ forms a 7- to 10-membered condensed ring having adjacent substituents on the conjugated 5-membered ring ligand connected to each other with two atoms in the 5-membered ring included. Specific examples of such a condensed ring include compounds such as azulene, and derivatives thereof. Specific examples of these compounds and derivatives include hydroazulenyl group, methylhydroazulenyl group, ethylhydroazulenyl group, dimethylhydroazulenyl group, methylethylhydro-azulenyl group, methylisopropylhydroazulenyl group, methylphenylisopropylhydroazolenyl group, hydrogenation products of various azulenyl groups, bicyclo-[6.3.0]-undecanyl group, methyl-bicyclo-[6.3.0]-undecanyl group, methyl-bicyclo-[6.3.0]-undecanyl group, phenyl-bicyclo-[6.3.0]-undecanyl group, methylphenyl-bicyclo-[6.3.0]-undecanyl group, ethylphenyl-bicyclo-[6.3.0]-undecanyl group, methyldiphenyl-bicyclo-[6.3.0]-undecanyl group, methyl-bicyclo-[6.3.0]-undecadienyl group, methylphenyl-bicyclo-[6.3.0]-undecadienyl group, ethylphenyl-bicyclo-[6.3.0]-undecadienyl group, methylisopropyl-bicyclo-[6.3.0]-undecadienyl group, bicyclo-[7.3.0]-dodecanyl group and derivatives thereof, bicyclo-[7.3.0]-dodecadienyl group and derivatives thereof, bicyclo-[8.3.0]-tridecanyl group and derivatives thereof, bicyclo-[8.3.0]-tridecadienyl group and derivatives thereof, etc.

Examples of the aforementioned various substituents include the aforementioned hydrocarbon groups, hydrocarbon groups containing atoms such as silicon, oxygen, nitrogen, phosphorus, boron and sulfur, halogen atoms, and halogen-containing hydrocarbon groups.

Q represents a bond group bridging two conjugated 5-membered ring ligands at arbitrary position. In other words, Q is a divalent bond group bridging $A_1$ to $A_2$. Although the kind of Q is not specifically limited, specific examples of Q include (a) divalent hydrocarbon group or halogenated hydrocarbon group having normally from 1 to 20, preferably from 1 to 12 carbon atoms, particularly unsaturated hydrocarbon group such as alkylene group and cycloalkylene group, haloalkylene group or halocycloalkylene group, (b) silylene group or oligosilylene group, (c) silylene group or oligosilylene group having a hydrocarbon group or halogenated hydrocarbon group having normally from 1 to 20, preferably from 1 to 12 carbon atoms as a substituent, (d) germylene group, (e) germylene group having a hydrocarbon group or halogenated hydrocarbon group having normally from 1 to 20 carbon atoms as a substituent, etc. Preferred among these groups are alkylene group, cycloalkylene group, arylene group, and silylene group or germylene group having a hydrocarbon group as a substituent.

M represents a transition metal atom selected from the group 4 of the periodic table, preferably zirconium or hafnium.

X and Y each independently represents a hydrogen atom, halogen atom, hydrocarbon group, alkylamide group, halogenated hydrocarbon groups, oxygen-containing hydrocarbon group, nitrogen-containing hydrocarbon group, phosphorus-containing hydrocarbon group, silicon-containing hydrocarbon group or sulfur-containing group to be connected to M. The number of carbon atoms in the aforementioned various hydrocarbon groups is normally from 1 to 20, preferably from 1 to 12. Preferred among these groups are hydrogen atom, chlorine atom, methyl group, isobutyl group, phenyl group, dimethylamide group, diethylamide group, and sulfinato group.

Specific examples of the transition metal compound of the present invention include the following compounds.

(29) Dichloro[dimethylsilylene(cyclopentadienyl)(2,4-dimethyl-4H-1-azulenyl)]hafnium
(30) Dichloro[dimethylsilylene(2-methyl-1-cyclopentadienyl)(2,4-dimethyl-4H-1-azulenyl)]hafnium
(31) Dichloro[dimethylsilylene(cyclopentadienyl)(2-methyl-4-phenyl-4H-1-azulenyl)]hafnium
(32) Dichloro[dimethylsilylene(cyclopentadienyl)(2-methyl-4-isopropyl-4H-1-azulenyl)]hafnium]
(33) Dichloro[dimethylsilylene(2-ethyl-1-cyclopentadienyl)(2,4-dimethyl-4H-1-azulenyl)]hafnium
(34) Dichloro[dimethylsilylene(9-fluorenyl)(2,4-dimethyl-4H-1-azulenyl)]hafnium
(35) Dichloro[dimethylsilylene(cyclopentadienyl)(2-ethyl-4-methyl-4H-1-azulenyl)]hafnium
(36) Dichloro[dimethylsilylene(2-methyl-1-cyclopentadienyl)(2-ethyl-4-methyl-4H-1-azulenyl)]hafnium
(37) Dichloro[dimethylsilylene(cyclopentadienyl)(2-ethyl-4-phenyl-4H-1-azulenyl)]hafnium
(38) Dichloro[dimethylsilylene(cyclopentadienyl)(2-ethyl-4-isopropy-4H-1-azulenyl)]hafnium
(39) Dichloro[dimethylsilylene(9-fluorenyl)(2-ethyl-4-methyl-4H-1-azulenyl)]hafnium
(40) Dichloro[dimethylsilylene(2,3-dimethyl-1-cyclo-pentadienyl)(2-ethyl-4-methyl-4H-1-azulenyl)]hafnium
(41) Dichloro[ethylene(cyclopentadienyl)(2,4-dimethyl-4H-1-azulenyl)]hafnium
(42) Dichloro[ethylene(2-methyl-1-cyclopentadienyl)(2,4-dimethyl-4H-1-azulenyl)]hafnium
(43) Dichloro[ethylene(cyclopentadienyl)(2-methyl-4-phenyl-4H-1-azulenyl)]hafnium

(44) Dichloro[ethylene(cyclopentadienyl)(2-methyl-4-isopropyl-4H-1-azulenyl)]hafnium
(45) Dichloro[ethylene(2-methyl-1-cyclopentadienyl)(2,4-dimethyl-4H-1-azulenyl)]hafnium
(46) Dichloro[ethylene(9-fluorenyl)(2,4-dimethyl-4H-1-azulenyl)]hafnium
(47) Dichloro[ethylene(cyclopentadienyl)(2-ethyl-4-methyl-4H-1-azulenyl)]hafnium
(48) Dichloro[ethylene(2-methyl-1-cyclopentadienyl)(2-ethyl-4-methyl-4H-1-azulenyl)]hafnium
(49) Dichloro[dimethylsilylene(2-methyl-1-cyclopentadienyl)(2-ethyl-4-phenyl-4H-1-azulenyl)]hafnium
(50) Dichlorodimethylsilylene(2-methyl-1-cyclopentadienyl)(2-ethyl-4-isopropyl-4H-1-azulenyl)]hafnium
(51) Dichloro[ethylene(9-fluorenyl)(2-ethyl-4-methyl-4H-1-azulenyl)]hafnium
(52) Dichloro[ethylene(9-fluorenyl)(2-ethyl-4-isopropyl-4H-1-azulenyl)]hafnium
(53) Dichloro[dimethylsilylene(cyclopentadienyl)(2-n-propyl-4-methyl-4H-1-azulenyl)]hafnium
(54) Dichloro[dimethylsilylene(cyclopentadienyl)(2-isopropyl-4-methyl-4H-1-azulenyl)]hafnium
(55) Dichloro[dimethylsilylene(cyclopentadienyl)(2-n-butyl-4-methyl-4H-1-azulenyl)]hafnium
(56) Dichloro[dimethylsilylene(2-methyl-1-cyclopentadienyl)(2-n-propyl-4-methyl-4H-1-azulenyl)]hafnium (57) Dichloro[dimethylsilylene(2-methyl-1-cyclopentadienyl)(2-isopropyl-4-methyl-4H-1-azulenyl)]hafnium
(58) Dichloro[dimethylsilylene(2-methyl-1-cyclopentadienyl)(2-n-butyl-4-methyl-4H-1-azulenyl)]hafnium
(59) Dichloro[dimethylsilylene(cyclopentadienyl)(2,4,8-trimethyl-4H-1-azulenyl)]hafnium
(60) Dichloro[dimethylsilylene(cyclopentadienyl)(2,4,6-trimethyl-4H-1-azulenyl)]hafnium
(61) Dichloro[dimethylsilylene(cyclopentadienyl)(2,4,7-trimethyl-4H-1-azulenyl)]hafnium
(62) Dichloro[dimethylsilylene(cyclopentadienyl)(2,4-dimethyl-6-isopropyl-4H-1-azulenyl)]hafnium
(63) Dichloro[dimethylsilylene(cyclopentadienyl)(2,4-dimethyl-7-isopropyl-4H-1-azulenyl)]hafnium
(64) Dichloro[dimethylsilylene(cyclopentadienyl)(2,4-dimethyl-8-isopropyl-4H-1-azulenyl)]hafnium
(65) Dichloro[dimethylsilylene(cyclopentadienyl)(2,4-dimethyl-6-ethyl-4H-1-azulenyl)]hafnium
(66) Dichloro[dimethylsilylene(cyclopentadienyl)(2,4-dimethyl-7-ethyl-4H-1-azulenyl)]hafnium
(67) Dichloro[dimethylsilylene(cyclopentadienyl)(2,4-dimethyl-8-ethyl-4H-1-azulenyl)]hafnium
(68) Dichloro[[di(chloromethyl)silylene(cyclopentadienyl)(2,4-dimethyl-4H-1-azulenyl)]hafnium
(69) Dichloro[[di(chloromethyl)silylene](cyclopentadienyl)(2,4-dimethyl-4H-1-azulenyl)]hafnium
(70) Dichloro[dimethylmethylene(cyclopentadienyl)(2,4-dimethyl-4H-1-azulenyl)]hafnium
(71) Dichloro[dimethylgermylene(cyclopentadienyl)(2,4-dimethyl-4H-1-azulenyl)]hafnium
(72) Dichloro[dimethylgermylene(2-methyl-1-cyclopentadienyl)(2,4-dimethyl-4H-1-azulenyl)]hafnium
(73) Dichloro[dimethylgermylene(2,3-medithyl-1-cyclopentadienyl)(2,4-dimethyl-4H-1-azulenyl)]hafnium
(74) Dichloro[dimethylgermylene(9-fluorenyl)(2,4-dimethyl-4H-1-azulenyl)]hafnium
(75) Dichloro[dimethylgermylene(cyclopentadienyl)(2-ethyl-4-methyl-4H-1-azulenyl)]hafnium
(76) Dichloro[dimethylgermylene(cyclopentadienyl)(2-n-propyl-4-methyl-4H-1-azulenyl)]hafnium
(77) Dichloro[dimethylgermylene(cyclopentadienyl)(2-isopropyl-4H-1-azulenyl)]hafnium
(78) Dichloro[dimethylgermylene(cyclopentadienyl)(2-n-butyl-4-methyl-4H-1-azulenyl)]hafnium
(79) Dichloro[dimethylgermylene(2-methyl-1-cyclopentadienyl)(2-ethyl-4-methyl-4H-1-azulenyl)]hafnium
(80) Dichloro[dimethylgermylene(2,3-dimethyl-1-cyclopentadienyl)(2-ethyl-4-methyl-4H-1-azulenyl)]hafnium
(81) Dichloro[dimethylgermylene(9-fluorenyl)(2-ethyl-4-methyl-4H-1-azulenyl)]hafnium
(82) Dichloro[dimethylgermylene(2-methyl-1-cyclopentadienyl)(2-n-propyl-4-methyl-4H-1-azulenyl)]hafnium
(83) Dichloro[dimethylgermylene(2,3-dimethyl-1-cyclopentadienyl)(2-n-propyl-4-methyl-4H-1-azulenyl)]hafnium
(84) Dichloro[dimethylgermylene(9-fluorenyl)(2-n-propyl-4-methyl-4H-1-azulenyl)]hafnium
(85) Dichloro[dimethylsilylene(3-trimethylsilyl-1-cyclopentadienyl)(2,4-dimethyl-4H-1-azulenyl)]hafnium
(86) Dichloro[dimethylsilylene(3-trimethylsilyl-1-cyclopentadienyl)(2-ethyl-4-methyl-4H-1-azulenyl)]hafnium
(87) Dichloro[dimethylgermylene(3-trimethylsilyl-1-cyclopentadienyl)(2,4-dimethyl-4H-1-azulenyl)]hafnium
(88) Dichloro[dimethylgermylene(3-trimethylsilyl-1-cyclopentadienyl)(2-ethyl-4-methyl-4H-1-azulenyl)]hafnium
(89) Dibromo[dimethylgermylene(cyclopentadienyl)(2,4-dimethyl-4H-1-azulenyl)]hafnium
(90) Dibromo[dimethylsilylene(2-methyl-1-cyclopentadienyl)(2,4-dimethyl-4H-1-azulenyl)]hafnium
(91) Dibromo[dimethylsilylene(2,3-dimethyl-1-cyclopentadienyl)(2,4-dimethyl-4H-1-azulenyl)]hafnium
(92) Dibromo[dimethylsilylene(9-fluorenyl)(2,4-dimethyl-4H-1-azulenyl)]hafnium
(93) Diiodo[dimethylsilylene(cyclopentadienyl)(2,4-dimethyl-4H-1-azulenyl)]hafnium
(94) Diiodo[dimethylsilylene(2-methyl-1-cyclopentadienyl)(2,4-dimethyl-4H-1-azulenyl)]hafnium
(95) Diiodo[dimethylsilylene(2,3-dimethyl-1-cyclopentadienyl)(2,4-dimethyl-4H-1-azulenyl)]hafnium
(96) Diiodo[dimethylsilylene(9-fluorenyl)(2,4-dimethyl-4H-1-azulenyl)]hafnium
(97) Diiodo[dimethylsilylene(cyclopentadienyl)(2,4-dimethyl-4H-1-azulenyl)]hafnium
(98) Diiodo[dimethylsilylene(2-methyl-1-cyclopentadienyl)(2,4-dimethyl-4H-1-azulenyl)]hafnium
(99) Diiodo[dimethylsilylene(2,3-dimethyl-1-cyclopentadienyl)(2,4-dimethyl-4H-1-azulenyl)]hafnium
(100) Dimethyl[dimethylsilylene(9-fluorenyl)(2,4-dimethyl-4H-1-azulenyl)]hafnium
(101) Dihydride[dimethylsilylene(cyclopentadienyl)(2,4-dimethyl-4H-1-azulenyl)]hafnium
(102) Dihydride[dimethylsilylene(2-methyl-1-cyclopentadienyl)(2,4-dimethyl-4H-1-azulenyl)]hafnium
(103) Dihydride[dimethylsilylene(2,3-dimethyl-1-cyclopentadienyl)(2,4-dimethyl-4H-1-azulenyl)]hafnium
(104) Dihydride[dimethylsilylene(9-fluorenyl)(2,4-dimethyl-4H-1-azulenyl)]hafnium
(105) Bis(dimethylamide)[dimethylsilylene(cyclopentadienyl)(2,4-dimethyl-4H-1-azulenyl)]hafnium
(106) Bis(dimethylamide)[dimethylsilylene(2-methyl-1-cyclopentadienyl)(2,4-dimethyl-4H-1-azulenyl)]hafnium
(107) Bis(dimethylamide)[dimethylsilylene(2,3-dimethyl-1-cyclopentadienyl)(2,4-dimethyl-4H-1-azulenyl)]hafnium
(108) Bis(dimethylamide)[dimethylsilylene(9-fluorenyl)-(2,4-dimethyl-4H-1-azulenyl)]hafnium
(109) Bisphenoxy[dimethylsilylene(cyclopentadienyl)(2,4-dimethyl-4H-1-azulenyl)]hafnium (110) Bisphenoxy[dimethylsilylene(2-methyl-1-cyclopentadienyl)(2,4-dimethyl-4H-1-azulenyl)]hafnium
(111) Bisphenoxy[dimethylsilylene(2,3-dimethyl-1-cyclopentadienyl)(2,4-dimethyl-4H-1-azulenyl)]hafnium
(112) Bisphenoxy[dimethylsilylene(9-fluorenyl)(2,4-dimethyl-4H-1-azulenyl)]hafnium
(113) Bismethanesulfinato[dimethylsilylene(cyclopentadienyl)(2,4-dimethyl-4H-1-azulenyl)]hafnium
(114) Bismethanesulfinato[dimethylsilylene(2-methyl-1-cyclopentadienyl)(2,4-dimethyl-4H-1-azulenyl)]hafnium
(115) Bismethanesulfinato[dimethylsilylene(2,3-dimethyl-1-cyclopentadienyl)(2,4-dimethyl-4H-1-azulenyl)]hafnium
(116) Bismethanesulfinato[dimethylsilylene(9-fluorenyl)(2,4-dimethyl-4H-1-azulenyl)]hafnium
(117) Bistrifluoromethanesulfinato[dimethylsilylene-(cyclopentadienyl)(2,4-dimethyl-4H-1-azulenyl)]hafnium
(118) Bistrifluoromethanesulfinato[dimethylsilylene(2-methyl-1-cyclopentadienyl)(2,4-dimethyl-4H-1-azulenyl)]hafnium
(119) Bistrifluoromethanesulfinato[dimethylsilylene(2,3-dimethyl-1-cyclopentadienyl)(2,4-dimethyl-4H-1-azulenyl)]hafnium
(120) Bistrifluoromethanesulfinato[dimethylsilylene(9-fluorenyl)(2,4-dimethyl-4H-1-azulenyl)]hafnium
(121) Bis-p-toluenesulfinato[dimethylsilylene(cyclopentadienyl)(2,4-dimethyl-4H-1-azulenyl)]hafnium
(122) Bis-p-toluenesulfinato[dimethylsilylene(2-methyl-1-cyclopentadienyl)(2,4-dimethyl-4H-1-azulenyl)]hafnium
(123) Bis-p-toluenesulfinato[dimethylsilylene(2,3-dimethyl-1-cyclopentadienyl)(2,4-dimethyl-4H-1-azulenyl)]hafnium
(124) Bis-p-toluenesulfinato[dimethylsilylene(9-fluorenyl)(2,4-dimethyl-4H-1-azulenyl)]hafnium
(125) Dichloro[dimethylsilylene(1-indenyl)(2,4-dimethyl-4H-1-azulenyl)]hafnium
(126) Dichloro[dimethylsilylene(2-methyl-1-indenyl)(2,4-dimethyl-4H-1-azulenyl)]hafnium
(127) Dichloro[dimethylsilylene(1-indenyl)(2-ethyl-4-methyl-4H-1-azulenyl)]hafnium
(128) Dichloro[dimethylsilylene(2-methyl-1-indenyl)(2-ethyl-4-methyl-4H-1-azulenyl)]hafnium
(129) Dibromo[dimethylsilylene(1-indenyl)(2,4-dimethyl-4H-1-azulenyl)]hafnium
(130) Dibromo[dimethylsilylene(2-methyl-1-indenyl)(2,4-dimethyl-4H-1-azulenyl)]hafnium
(131) Dibromo[dimethylsilylene(1-indenyl)(2-ethyl-4-methyl-4H-1-azulenyl)]hafnium
(132) Dibromo[dimethylsilylene(2-methyl-1-indenyl)(2-ethyl-4-methyl-4H-1-azulenyl)]hafnium
(133) Diiodo[dimethylsilylene(1-indenyl)(2,4-dimethyl-4H-1-azulenyl)]hafnium
(134) Diiodo[dimethylsilylene(2-methyl-1-indenyl)(2,4-dimethyl-4H-1-azulenyl)]hafnium
(135) Diiodo[dimethylsilylene(1-indenyl)(2-ethyl-4-methyl-4H-1-azulenyl)]hafnium
(136) Diiodo[dimethylsilylene(2-methyl-1-indenyl)(2-ethyl-4-methyl-4H-1-azulenyl)]hafnium
(137) Dimethyl[dimethylsilylene(1-indenyl)(2,4-dimethyl-4H-1-azulenyl)]hafnium
(138) Dimethyl[dimethylsilylene(2-methyl-1-indenyl)(2,4-dimethyl-4H-1-azulenyl)]hafnium
(139) Dimethyl[dimethylsilylene(1-indenyl)(2-ethyl-4-methyl-4H-1-azulenyl)]hafnium
(140) Dimethyl[dimethylsilylene(2-methyl-1-indenyl)(2-ethyl-4-methyl-4H-1-azulenyl)]hafnium
(141) Dichloro[dimethylsilylene(cyclopentadienyl)(2,4-dimethyl-4H-5,6,7,8-tetrahydro-1-azulenyl)]hafnium
(142) Dichloro[dimethylsilylene(2-methyl-1-cyclopentadienyl)(2,4-dimethyl-4H-5,6,7,8-tetrahydro-1)]hafnium
(143) Dichloro[dimethylsilylene(2-methyl-1-indenyl)(2,4-dimethyl-4H-5,6,7,8-tetrahydro-1-azulenyl)]hafnium
(144) Dichloro[dimethylsilylene(9-fluorenyl)(2,4-dimethyl-4H-5,6,7,8-tetrahydro-1-azulenyl)]hafnium
(145) Dichloro[dimethylsilylene(cyclopentadienyl)(2-chloromethyl-4-methyl-4H-1-azulenyl)]hafnium
(146) Dichloro[dimethylsilylene(cyclopentadienyl)(2-methyl-4-chloromethyl-4H-1-azulenyl)]hafnium Further, compounds exemplified above but having titanium or zirconium instead of hafnium as central metal M can be exemplified. These compounds may be used in combination of two or more thereof. Transition metal components may be additionally added during the first stage of the polymerization or before the beginning of the second stage of the polymerization.

In the present invention, as co-catalysts there are preferably used one of more materials selected from the group consisting of (1) an organic aluminum oxy compound, (2) an ionic compound capable of reacting with a transition metal component to convert it to a cation, (3) a Lewis acid and (4) an ion-exchanging layered compound except silicate or an inorganic silicate. Specific examples of the organic aluminum oxy compound (1) include compounds represented by the following general formulae (II), (III) and (IV).

In the various general formulae, $R^4$ represents a hydrogen atom or a hydrocarbon residue, preferably a hydrocarbon residue having from 1 to 10, more preferably from 1 to 6 carbon atoms. The plurality of $R^4$'s may be the same or different. The suffix p represents an integer of from 0 to 40, preferably from 2 to 30.

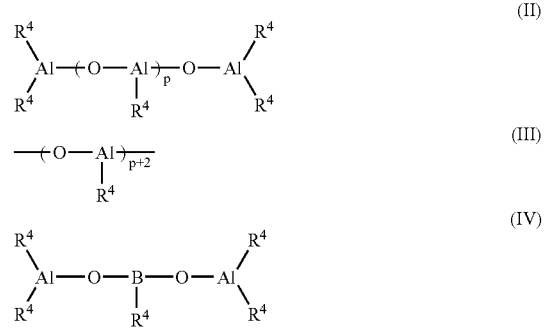

The compounds represented by the general formulae (II) and (III) each is a compound also called as aluminoxane obtained by the reaction of one or more trialkyl aluminum with water. Specific examples of these compounds include (a) methyl aluminoxane, ethyl aluminoxane, propyl aluminoxane, butyl aluminoxane and isobutyl aluminoxane, which are obtained from one trialkyl aluminum and water, (b) methylethyl aluminoxane, methylbutyl aluminoxane and methylisobutyl aluminoxane, which are obtained from two trialkyl aluminums and water, etc. Preferred among these aluminoxanes are methyl aluminoxane and methylisobutyl aluminoxane. A plurality of the aforementioned aluminoxanes may be used in combination. The aforementioned aluminoxanes can be prepared under various known conditions.

The compound represented by the general formula (IV) can be obtained by the reaction of one or more trialkyl aluminums with an alkylboronic acid represented by the following general formula (V) at a ratio of from 10:1 to 1:1 (molar ratio). In the general formula (V), $R^5$ represents a hydrocarbon residue or halogenated hydrocarbon group having from 1 to 10, preferably from 1 to 6 carbon atoms.

$$R^5-B(OH)_2 \quad (V)$$

Specific examples of the compound include the following reaction products, i.e., (a) 2:1 reaction product of trimethyl aluminum and methylboronic acid, (b) 2:1 reaction product of triisobutyl aluminum and methylboronic acid, (c) 1:1:1 reaction product of trimethyl aluminum, triisobutyl aluminum and methylboronic acid, (d) 2:1 reaction product of trimethyl aluminum and ethylboronic acid, (e) 2:1 reaction product of triethyl aluminum and butylboronic acid, etc.

Examples of the ionic compound (2) capable of reacting with a transition metal component to convert it to a cation include a compound represented by the general formula (VI).

$$[K]^{n+}[Z]^{n-} \quad (VI)$$

In the general formula (VI), K is a cation component such as carbonium cation, tropilium cation, ammonium cation, oxonium cation, sulfonium cation and phosphonium cation. Alternatively, a cation of a metal which can be easily reduced itself, cation of an organic metal or the like can be used.

Specific examples of the aforementioned cations include triphenyl carbonium, diphenyl carbonium, cycloheptatrienium, indenium, triethyl ammonium, tripropyl ammonium, tributyl ammonium, N,N-dimethylanilium, dipropyl ammonium, dicyclohexyl ammonium, triphenyl phosphonium, trimethyl phosphonium, tris (dimethylphenyl) phosphonium, tris(dimethylphenyl) phosphonium, tris(methylphenyl) phosphonium, triphenyl sulfonium, triphenyl sulfonium, triphenyl oxonium, triethyl oxonium, pyrilium, silver ion, gold ion, platinum ion, copper ion, palladium, mercury ion, ferrocenium ion, etc.

In the aforementioned general formula (VI), Z is an anion component which forms a counter anion (normally a non-coordination component) with respect to cation seed converted from transition metal component. Examples of Z include organic boron compound anions, organic aluminum compound anions, organic gallium compound anions, organic arsenic compound anions, organic antimony compound anions, etc. Specific examples of these compounds include (a) tetraphenylboron, tetrakis(3,4,5-trifluorophenyl)boron, tetrakis[3,5-bis(trifluoromethyl)phenyl]boron, tetrakis[3,5-di(t-butyl)phenyl]boron, tetrakis(pentafluorophenyl)boron, etc., (b) tetraphenylaluminum, tetrakis (3,4,5-trifluorophenyl)aluminum, tetrakis[3,5-bis(trifluoro-methyl)phenyl]aluminum, tetrakis[3,5-di(t-butyl)phenyl]aluminum, tetrakis(pentafluorophenyl)aluminum, etc., (c) tetraphenylgallium, tetrakis(3,4,5-trifluorophenyl)gallium, tetrakis[3,5-bis(trifluoromethyl)phenyl]gallium, tetrakis[3,5-di(t-butyl)phenyl]gallium, tetrakis(pentafluorophenyl)gallium, etc., (d) tetraphenylphosphorus, tetrakis(pentafluorophenyl)-phosphorus, etc., (e) tetraphenyl arsenic, tetrakis(pentafluorophenyl)arsenic, etc., (f) tetraphenyl antimony, tetrakis(pentafluorophenyl)-antimony, etc., and (g) decaborate, undecaborate, carbadodecaborate, decachlorodecaborate, etc.

Specific examples of the Lewis acid (3), particularly Lewis acid capable of converting a transition metal component to a cation, include various organic boron compounds, metal halogen compounds, solid acids, etc. Specific examples of these Lewis acids will be given below. In other words, there may be exemplified (a) organic boron compounds such as triphenylboron, tris(3,5-difluorophenyl)boron and tris(pentafluorophenyl)boron, (b) metal halogen compounds such as aluminum chloride, aluminum bromide, aluminum iodide, magnesium chloride, magnesium bromide, magnesium iodide, magnesium bromochloride, magnesium chloroiodide, magnesium bromoiodide, chlorinated magnesium hydride, chlorinated magnesium hydroxide, bromated magnesium hydroxide, chlorinated magnesium alkoxide and bromated magnesium alkoxide, (c) solid acids such as alumina and silica alumina, etc.

The ion-exchanging layered compound except silicate (4) is a compound having a crystalline structure comprising planes formed by ionic bonds stacked in parallel to each other by a weak bonding power and containing exchangeable ions.

Examples of the ion-exchanging layered compound except silicate include ionically crystalline compounds having a layered crystalline structure such as hexagonal closest packing structure, antimony structure, $CdCl_2$ structure and $CdI_2$ structure, etc. Specific examples of these compounds include crystalline acidic salts of polyvalent metals such as ($\alpha$-$Zr(HAsO_4)_2 \cdot H_2O$, ($\alpha$-$Zr(HPO_4)_2$, ($\alpha$-$Zr(KPO_4)_2 \cdot 3H_2O$, ($\alpha$-$Ti(HPO_4)_2$, ($\alpha$-$Ti(HAsO_4)_2 \cdot H_2O$, ($\alpha$-$Sn(HPO_4)_2 \cdot H_2O$, ($\gamma$-$Zr(HPO_4)_2$, ($\gamma$-$Ti(HPO_4)_2$ and ($\gamma$-$Ti(NH_4PO_4)_2 \cdot H_2O$.

Examples of the inorganic silicate include clay, clay mineral, zeolite, diatomaceous earth, etc. These inorganic silicates may be used in the form of synthetic product or natural product.

Specific examples of clay and clay mineral include allophanes such as allophane, kaolins such as dickite, nakhlite, kaolinite and anoxite, halloysites such as methahalloysite and halloysite, serpentines such as chrysotile, lizardite and antigorite, smectites such as montmorillonite, zauconite, beidellite, nontronite, saponite and hectorite, vermiculites such as vermiculite, micas such as ilite, sericite and glauconite, attapulgite, sepiolite, pigolskite, kaolinite-based clay, Gairome clay, hisingerite, pyrophyllite, chlorite group, etc. These clay materials may form a mixed layer.

Examples of artificially synthesized products include synthetic mica, synthetic hectorite, synthetic saponite, synthetic taeniolite, etc.

Preferred among these specific examples are kaolins such as dickite, nakhlite, kaolinite and anoxite, halloysites such as methahalloysite and halloysite, serpentines such as chrysotile, lizardite and antigorite, smectites such as montmorillonite, zauconite, beidellite, nontronite, saponite and hectorite, vermiculites such as vermiculite, micas such as ilite, sericite and glauconite, synthetic mica, synthetic hectorite, synthetic saponite, and synthetic taeniolite, particularly smectites such as montmorillonite, zauconite, beidellite, nontronite, saponite and hectorite, vermiculites such as vermiculite, synthetic mica, synthetic hectorite, synthetic saponite, and synthetic taeniolite.

The ion-exchanging layered compounds except silicate or inorganic silicates may be used as they are but are preferably subjected to acid treatment with hydrochloric acid, nitric acid, sulfuric acid or the like and/or treatment with a salt such as LiCl, NaCl, KCl, $CaCl_2$, $MgCl_2$, $Li_2SO_4$, $MgSO_4$, $ZnSO_4$, $Ti(SO_4)_2$, $Zr(SO_4)_2$ and $Al_2(SO_4)_3$. The treatment may be carried out by mixing corresponding acid and base to produce a salt in the reaction system. Further, shape control such as grinding and granulation may be effected. In order to obtain a solid catalyst component having an excellent particle fluidity, granulation is preferably effected. The aforementioned component is normally dehydrated and dried before use. As the co-catalyst component there is preferably used the ion-exchanging layered compound except silicate or inorganic silicate (4) from the standpoint of catalytic properties such as polymerization activity.

In the polymerization of the present invention, as an arbitrary component which is a co-catalyst component there may be used an organic aluminum compound. Such an organic aluminum compound is a compound represented by $AlR^1{}_mZ_{3-m}$ (in which $R^1$ is a hydrocarbon group having from 1 to 20 carbons, Z is a hydrogen atom, halogen atom, alkoxy group or aryloxy group, and m is a number of from greater than 0 to not greater than 3).

Specific examples of the organic aluminum compound include trialkyl aluminum such as trimethyl aluminum, triethyl aluminum, tripropyl aluminum and triisobutyl aluminum, halogen or alkoxy-containing alkyl aluminum such as diethyl aluminum monochloride and diethyl aluminum ethoxide, and hydrogen-containing organic aluminum compound such as diethyl aluminum hydride and diisobutyl aluminum hydride. Besides these organic aluminum compounds, aluminoxanes such as methyl aluminoxane, etc. may be used. Particularly preferred among these organic aluminum compounds is trialkyl aluminum. These arbitrary components may be used in combination of two or more thereof. Further, the aforementioned arbitrary components may be newly added after the beginning of the polymerization or at any other time.

The catalyst of the present invention can be obtained by the catalytic action of a transition metal component, a co-catalyst component and optionally an organic aluminum compound component, but the catalytic method is not specifically limited. This catalytic action may be effected not only during the preparation of the catalyst but also during pre-polymerization by propylene or during polymerization.

A polymer such as polyethylene and polypropylene or a solid inorganic oxide such as silica and alumina may be present or brought into contact with the various catalyst components during or after the catalytic action.

The catalytic action may be effected in an inert gas such as nitrogen or in an inert hydrocarbon solvent such as pentane, hexane, heptane, toluene and xylene. As these solvents there are preferably used those which have been subjected to treatment for removal of poisoning materials such as water and sulfur compound. The catalytic action is preferably effected at a temperature of from –20° C. to the boiling point of the solvent used, particularly from room temperature to the boiling point of the solvent used.

The amount of the various catalyst components to be used are not specifically limited. However, in the case where as a co-catalyst component there is used an ion-exchanging layered compound except silicate or inorganic silicate, the amount of the transition metal component and the organic aluminum compound as an arbitrary component can be predetermined to be from 0.0001 to 10 mmol, preferably from 0.001 to 5 mmol, and from 0 to 10,000 mmol, preferably from 0.01 to 100 mmol per g of co-catalyst component, respectively, to give good results in respect to polymerization activity. The atomic ratio of the transition metal in the transition metal component to aluminum in the organic aluminum compound as an arbitrary component is preferably controlled to a range of from 1:0 to 1,000,000, more preferably from 1:0.1 to 100,000 similarly from the standpoint of polymerization activity.

The catalyst thus obtained may or may not be washed with an inert hydrocarbon solvent such as n-pentane, n-hexane, n-heptane, toluene and xylene before use.

During washing, the aforementioned organic aluminum compound may be additionally used as necessary. The amount of the organic aluminum compound to be used herein is preferably predetermined such that the atomic ratio of the transition metal in the transition metal component to aluminum in the organic aluminum compound is from 1:0 to 10,000.

As the catalyst there may be also used one obtained by preliminarily polymerizing an α-olefin such as ethylene, propylene, 1-butene, 1-hexene, 1-octene, 4-methyl-1-pentene, 3-methyl-1-butene, vinyl cycloalkane and styrene, and then optionally washing the product. The preliminary polymerization may be effected in an inert gas such as nitrogen or in an inert hydrocarbon solvent such as n-pentane, n-hexane, n-heptane, toluene and xylene.

The polymerization reaction in the present invention is effected in the presence or absence of an inert hydrocarbon such as propane, n-butane, isobutane, n-hexane, n-heptane, toluene, xylene, cyclohexane and methyl cyclohexane or a liquid such as liquefied α-olefin. The polymerization is preferably effected in the presence of the aforementioned inert hydrocarbon among these materials. Alternatively, a mixture of the aforementioned compounds may be used as a solvent.

In some detail, a propylene-based polymer is preferably produced in the presence of a transition metal component and a co-catalyst component or in the presence of a transition metal component, a co-catalyst component and an organic aluminum compound as an arbitrary component. The polymerization temperature, the polymerization pressure and the polymerization time are not specifically limited, but optimum predetermination can be conducted within the following range taking into account the productivity and process. In some detail, the polymerization temperature is normally predetermined to be from –20° C. to 150° C., preferably from 0° C. to 100° C., the polymerization pressure is predetermined to be from 0.1 MPa to 100 MPa, preferably from 0.3 MPa to 10 MPa, more preferably from 0.5 MPa to 4 MPa, and the polymerization time is predetermined to be from 0.1 to 10 hours, preferably from 0.3 to 7 hours, more preferably from 0.5 to 6 hours.

In the present invention, it is necessary that the weight-average molecular weight Mw of the polymer be predetermined to be from not smaller than 5,000 to less than 1,000,000 as previously mentioned. The adjustment of the molecular weight of the polymer can be carried out by a known method. In some detail, a method which comprises controlling the polymerization temperature to adjust molecular weight, a method which comprises controlling the monomer concentration to adjust molecular weight, a method which comprises using a chain transfer agent to control molecular weight, etc. may be employed. The chain transfer agent, if used, is preferably hydrogen. The molecular weight of the polymer can be controlled by the structure of the catalyst. In particular, in the case where a bridged metallocene is used, the α-position structure as the top of bridging group as base point is important. In general, in the case where the α-position atom is hydrogen atom, the elimination of β-hydrogen from the growing polymer chain can easily occur during polymerization, resulting in the production of a polymer having a low molecular weight. On the contrary, in the case where some substituent (e.g., methyl group) is present in the α-position, the elimination of β-hydrogen from the growing polymer chain can be inhibited, making it easy to produce a high molecular polymer. As mentioned above, the propylene-based polymer according to the present invention can normally be preferably used as a solvent-soluble coating material or aqueous dispersion coating material when it has a weight-average molecular weight Mw of less than 200,000 or can be used as an aqueous dispersion coating material having particularly good properties when it has a weight-average molecular weight Mw of not smaller than 200,000.

As previously mentioned, in the present invention, it is necessary that in $^{13}$C-NMR, peaks derived from the carbon atom in a methyl group in a propylene unit chain formed by head-to-tail bond be observed and, supposing that the chemical shift of the top of a peak assigned to a pentad represented by mmmm is 21.8 ppm, the ratio of the area $S_5$ of the peak having its top at 21.8 ppm to the total area S of peaks appearing within a range of from 19.8 ppm to 22.2 ppm is from not smaller than 10% to not greater than 60%, and, supposing that the area of a peak having its top at 21.5 to 21.6 ppm is $S_6$, the relationship $4+2S_5/S_6>5$ be established, by controlling steric selectivity of the propylene unit chain formed by head-to-tail bond.

The method for controlling stereo selectivity is not specifically limited but may be normally a method which comprises controlling by the structure of the catalyst, a method which comprises controlling the polymerization conditions, etc. In the case where controlling is conducted by the structure of the catalyst, the structure of the ligands constituting the transition metal component is important. In particular, in the case where a bridged metallocene is used, the substituent on the α-position with the top of the bridging group as a base point is important. In general, in the case where there are somewhat bulky substituent in the α-position, the stereo selectivity can be easily enhanced. Further, in the case where a bridged metallocene containing ligands having a fused ring such as indenyl group and azulenyl group is used, the structure of substituent in the 4-position gives a great effect on the steric selectivity. In general, in the case where there are somewhat bulky substituent in the 4-position, the stereo selectivity can be easily enhanced. On the contrary, by introducing a sterically relatively small substituent into the 4-position, the stereo selectivity can be effectively reduced, making it possible to control over the deterioration of the crystallinity of the polymer thus produced.

Further, in the present invention, it is necessary to control the amount of regio irregular units in propylene insertion. Examples of the factors controlling the amount of regio irregular units include (a) structure of metallocene, (b) kind of co-catalyst, (c) polymerization temperature, (d) polymerization pressure, (e) kind and amount of chain transfer agent such as hydrogen, etc. The effect given by these factors on the amount of different kinds of bonds varies with the kind of the compound used and thus cannot be unequivocally defined. In general, however, when as a transition metal there is used hafnium, a tendency is given that a propylene polymer having a relatively great amount of regio irregular units is obtained. Further, when hafnium is used, 1,3-insertion can occur more easily than 2,1-insertion. In this respect, too, the use of hafnium is advantageous.

The propylene-based polymer of the present invention can be dissolved in a solvent. Specific examples of the solvent include hydrocarbons such as n-pentane, n-hexane, n-heptane, n-octane, n-decane, benzene, toluene, xylene, cyclohexane, methylcyclohexane and dimethylcyclohexane, halogenated hydrocarbons such as chloroform, methylene chloride, carbon tetrachloride, tetrachloroethane, chlorobenzene and o-dichlorobenzene, and polar solvents such as n-butyl acetate, methyl isobutyl ketone, tetrahydrofurane, cyclohexanone and dimethyl sulfoxide. Preferred among these solvents are hydrocarbons.

The solubility of the propylene-based polymer of the present invention is very excellent as compared with ordinary modification product of high stereo regularity isotactic polypropylene and exhibits an insoluble content of not greater than 1% by weight based on the total amount of the polymer as dissolved in a boiling heptane (98° C.) in a concentration of 10% by weight. More preferably, the insoluble content is not greater than 0.1% by weight, even more preferably below the limit of detection of insoluble contents. Further, the propylene-based polymer of the present invention preferably exhibits the same level of solubility as mentioned above also as dissolved in toluene at room temperature (25° C.) in a concentration of 10% by weight.

The method for measuring the solubility of the propylene-based polymer in heptane at 98° C. and in toluene at 25° C. in the present invention is as follows.

The propylene-based polymer is charged in a separable flask with an agitator in a concentration of 10% by weight in the solvent (heptane or toluene). The mixture is then heated to an external temperature of 110° C. for heptane or 120° C. for toluene to cause dissolution. When the internal temperature of the solution becomes constant, stirring lasts for two hours. When dissolved in heptane, the solution is immediately filtered through a SUS metal gauge #400 at a temperature of 98° C. during boiling. When dissolved in toluene, the solution is allowed to cool to 25° C., stand for 1 hour, and then filtered through a SUS metal gauge #400. The content left on the metal gauge is defined as insoluble content while the content passed through the metal gauge as a solution is defined as soluble content. The contents are each dried at 80° C. and 1 mmHg or less in a vacuum drier for 4 hours. The weight of the contents are each then measured to calculate the fraction of the insoluble content.

The propylene-based polymer of the present invention has no melting point. Therefore, the propylene-based polymer of the present invention exhibits a very high solubility as mentioned above. The melting point is measured using a Type TA2000 thermal analysis system produced by Du Pont Inc. in the following manner.

The sample (about 5 to 10 mg) is melted at 200° C. for 5 minutes, cooled to 20° C. at a rate of 10° C./min where it is kept for 5 minutes, and then heated to 200° C. at a rate of 10° C./min to obtain a melt curve from which the temperature of the top of main endothermic peak in the last temperature rising step is then determined as melting point.

The term "having no melting point" as used in the present invention is meant to indicate that there are no melting point peaks. A DSC curve apparently analogous to melting point peak are occasionally obtained due to variation of base line, etc. In this case, the presence or absence of corresponding crystallization peaks in the aforementioned temperature falling step is used to judge if the DCS curve is a melting point peak. In other words, when no corresponding crystallization peaks are recognized, it is considered that there are no melting point peaks.

The propylene-based polymer of the present invention is soluble in a solvent as mentioned above and thus can be applied to a molded olefin-based polymer (base material) having crystallinity. Examples of the olefin-based polymer to be used as a base material include olefin-based polymers such as high pressure polyethylene, low-middle pressure polyethylene, polypropylene, poly-4-methyl-1-pentene, poly-1-butene and polystyrene, olefin copolymers such as ethylene-propylene copolymer, ethylene-butene copolymer and propylene-butene copolymer, etc. Preferred among these olefin copolymers are propylene-based polymers.

The coat layer formed by applying the propylene-based polymer of the present invention to a base material exhibits a good adhesion to an olefin-based polymer which is a base material. Accordingly, the propylene-based polymer of the present invention can be used as an adhesive resin for the aforementioned olefin-based polymer. In order to obtain a good adhesion, coating is preferably followed by heating. The heating temperature is not specifically limited but is preferably from 50° C. to 150° C., more preferably from 60° C. to 130° C. taking into account practicability. The coating method is not specifically limited. Any known method such as spray coating method, roller coating method and brush coating method can be employed.

Further, the propylene-based polymer of the present invention is soluble in a solvent and thus can be used to cause graft copolymerization of polar monomers in a solvent to produce a graft-modified propylene-based polymer. Specific examples of the monomers to be used in graft modification include monoolefindicarboxylic acids and anhydrides thereof, and monoalkylester of monoolefindicarboxylic acids. Specific examples of the aforementioned monoolefindicarboxylic acids include maleic acid, chloromaleic acid, citraconic acid, itaconic acid, glutaconic acid, 3-methyl-2-pentenediacid, 2-methyl-2-pentenediacid, 2-hexenediacid, etc. Preferred among these monoolefindicarboxylic acids is maleic acid. Further, anhydrides of these monoolefindicarboxylic acids, and compounds obtained by esterifying one of the carboxyl groups in these monoolefindicarboxylic acids by alkyl alcohol, i.e., monoalkylester of monoolefindicarboxylic acids may be exemplified as monomers to be used in graft modification.

The graft-modified propylene-based polymer thus obtained, too, is soluble in a solvent and thus can be applied to a molded olefin-based polymer (base material) having crystallinity. The coat layer formed by application exhibits a good adhesion to a base material. Examples of the olefin-based polymer include olefin-based polymers such as high pressure polyethylene, low-middle pressure polyethylene, polypropylene, poly-4-methyl-1-pentene, poly-1-butene and polystyrene, olefin copolymers such as ethylene-propylene copolymer, ethylene-butene copolymer and propylene-butene copolymer, etc. Preferred among these olefin copolymers are propylene-based polymers. The graft-modified propylene-based polymer can be used in the surface treatment of molded product made of polypropylene and synthetic rubber, molded product made of polyamide resin, unsaturated polyester resin, polybutylene terephthalate resin, polycarbonate resin, etc., e.g., automobile bumper, and steel plate and steel plate for electrolytic deposition. Further, the graft-modified propylene-based polymer can be applied to a surface coated with a coating compound mainly composed of a polyurethane resin, an aliphatic acid-modified polyester resin, an oil-free polyester resin, a melamine resin, an epoxy resin, etc., a primer, an adhesive, etc. to improve the adhesion of a coating compound, etc. thereto as well as to form a coat layer excellent in sharpness, low temperature impact resistance, etc.

A coating compound can be applied to the surface of a molded product on which a modified propylene-based polymer obtained by graft modification of the propylene-based polymer of the present invention with a polar monomer has been coated to form a coat layer by a method such as electrostatic coating, spray coating and brush coating.

The application of the coating compound can be carried out by a method involving undercoating followed by finish coating. The coat layer thus formed can be cured by an ordinary method involving heating by a nichrome wire, infrared ray, high frequency wave or the like to obtain a molded product having a desired coat layer formed thereon. The method for curing the coat layer is properly selected depending on the material and shape of the molded product, properties of the coating compound used, etc.

The modified propylene-based polymer obtained by graft modification of the propylene-based polymer of the present invention with a polar monomer can make the use of its characteristics of excellent adhesion, peel strength and water resistance to find application to a wide range of purposes besides the aforementioned primer for molded product. The modified propylene-based polymer can be used also as additive for adhesive or coating compound, ink binder, etc.

As mentioned above, the propylene-based polymer according to the present invention may be in the form of aqueous dispersion containing a surface active agent and water. The surface active agent preferably contains at least two nonionic surface active agents. In other words, two nonionic surface active agents having different HLB values are used in combination from the standpoint of the particle diameter of dispersed particles in the aqueous dispersion obtained and the water resistance of the coat layer. Examples of the nonionic surface active agents include polyoxyethylene alkyl ether, polyoxyethylene alkyl phenyl ether, polyoxyethylenealiphatic acid ester, polyxoyethylenesorbitanaliphatic acid ester, polyoxyethylene sorbitolaliphatic acid ester, polyoxyethylene polyoxypropylene block polymer, sorbitanaliphatic acid ester, polyoxyalkylene alkyl ether, glycerinaliphatic acid ester, polyoxyethylene alkylamine, alkyl alkanol amide, etc.

For the formation of the aqueous dispersion, any of anionic surface active agents, cationic surface active agents and amphoteric surface active agents may be used besides the nonionic surface active agents. However, from the standpoint of the particle diameter of dispersed particles in the aqueous dispersion obtained and the water resistance of the coat layer, anionic surface active agents are preferably used. Examples of the anionic surface active agents include aliphatic acid salts, alkylsulfuric acid esters, polyoxyethylene alkyl ether sulfuric acid esters, sodium alkylbenzenesulfonate, sodium alkylnaphthalenesulfonate, alkylsulfosuccinates, alkyldiphenyletherdisulfonates, alkylphosphonates, naphthalinesulfonic acid-formalin condensate, etc.

The combination of two or more nonionic surface active agents is preferably accomplished by selecting at least one each from (b1) nonionic surface active agents having H.L.B. of from not smaller than 13.5 to not greater than 14.5 and (b2) nonionic surface active agents having H.L.B. of from not smaller than 16.0 to not greater than 17.0. The mixing ratio (b1)/(b2) of the two or more nonionic surface active agents is preferably from 1/9 to 9/1 particularly from the standpoint of the particle diameter of dispersed particles in the aqueous dispersion obtained and the water resistance of the coat layer.

Examples of the nonionic surface active agent (b1) having a surface active agent component having H.L.B. of from not smaller than 13.5 to not greater than 14.5 include one or a mixture of two selected from the group consisting of polyoxyethylene cetyl ether, polyoxyethylene stearyl ether and polyoxyethylene nonyl phenyl ether having H.L.B. of from not smaller than 13.5 to not greater than 14.5. In particular, one or a mixture of two or more selected from the group consisting of polyoxyethylene cetyl ether (number of mols of ethylene oxide added: from 10 to 14 mols), polyoxyethylene stearyl ether (number of mols of ethylene oxide added: from 11 to 14 mols) and polyoxyethylene nonyl phenyl ether (number of mols of ethylene oxide added: from 10 to 14 mols) is preferred. More preferably, polyoxyethylene cetyl ether (number of mols of ethylene oxide added: from 10 to 14 mols) is used.

Examples of the nonionic surface active agent (b2) having a surface active agent component having H.L.B. of from not smaller than 16.0 to not greater than 17.0 include one or a mixture of two selected from the group consisting of polyoxyethylene lauryl ether, polyoxyethylene oleyl ether and polyoxyethylene propylene alkyl ether. In particular, one or a mixture of two or more selected from the group consisting of polyoxyethylene lauryl ether (number of mols of ethylene oxide added: from 18 to 22 mols), polyoxyethylene oleyl ether (number of mols of ethylene oxide added: from 33 to 39 mols) and polyoxyethylene propylene alkyl ether (number of mols of ethylene oxide added: from 12 to 19 mols; number of mols of propylene oxide added: from 1 to 5 mols) is preferred. More preferably, polyoxyethylene lauryl ether (number of mols of ethylene oxide added: from 18 to 22 mols) is used.

As the calculation equation of H.L.B. of surface active agent component there is used Griffin's H.L.B. 1 process.
(1) Case of polyhydric alcohol aliphatic acid ester
H.L.B. value=20 (1−S/A)
S: Ester saponification value
A: Neutralization value of aliphatic acid
(2) Case of tall oil, common rosin, beeswax, laurin polyhydric alcohol derivative
H.L.B. value=(E+P)/5
E: % Oxyethylene content
P: % Polyhydric alcohol content
(3) Case where the hydrophilic group is only an oxyethylene group
H.L.B. value=E/5

The mixing ratio (b1/b2) of the nonionic surface active agent (b1) to the nonionic surface active agent (b2) is preferably from 1/9 to 9/1, more preferably from 3/7 to 7/3. When the mixing ratio falls below 1/9, the water resistance of the coat layer is somewhat poor. When the mixing ratio exceeds 9/1, the resulting aqueous dispersion contains dispersed particles having a relatively great diameter that can somewhat deteriorate the dispersion stability.

During the formation of the aqueous dispersion, a basic material may be incorporated in the aqueous dispersion. The incorporation of the basic material in the aqueous dispersion makes it possible to enhance the dispersion stability of the propylene-based polymer according to the present invention. Examples of the basic material include inorganic bases, ammonia, and amines. Preferred among these basic materials are amines. Examples of the inorganic bases include sodium hydroxide, potassium hydroxide, sodium carbonate, potassium carbonate, and ammonium carbonate. Examples of ammonia and amines include alkylamines such as ammonia, methylamine, dimethylamine, trimethylamine, ethylamine, diethylamine, triethylamine, propylamine, butylamine, hexylamine and octylamine, alkanolamines such as ethanolamine, diethanolamine, triethanolamine, propanolamine, N-methyldiethanolamine, N,N-dimethylethanolamine, 2-amino-2-methyl-1-propanol and 2-dimethylamino-2-methyl-1-propanol, morpholine, etc. Preferred among these compounds is 2-amino-2-methyl-1-propanol.

The aqueous dispersion comprises a surface active agent containing two or more of the aforementioned nonionic surface active agents and water in an amount of from 1 to 100 parts by weight, preferably from 51 to 100 parts by weight, and from 100 to 1,000 parts by weight, preferably from 200 to 800 parts by weight, respectively, based on 100 parts by weight of the propylene-based polymer of the present invention. In the case where a basic material is used to enhance the dispersion stability of the propylene-based polymer, the basic material is incorporated in an amount of from 0.01 to 10 parts by weight, preferably from 0.1 to 5 parts by weight based on 100 parts by weight of the propylene-based polymer.

When the amount of the surface active agent component containing two or more nonionic surface active agents falls below 1 part by weight, the resulting aqueous dispersion contains dispersed particles having a great diameter that deteriorates the dispersion stability. When the amount of the surface active agent component containing two or more nonionic surface active agents exceeds 100 parts by weight, the coat layer exhibits a poor water resistance. When the amount of the basic material component falls below 0.01 parts by weight, the effect of enhancing the dispersion stability becomes insufficient. When the amount of the basic material component exceeds 10 parts by weight, the effect of enhancing the dispersion stability reaches saturation, the enhancement of the dispersion stability cannot be expected even if this amount is beyond this value. When the content of water falls below 100 parts by weight, the resulting aqueous dispersion has too high a solid content concentration and hence an insufficient dispersion stability. When the content of water exceeds 1,000 parts by weight, the resulting aqueous dispersion has too low an effective component concentration and thus is practically disadvantageous.

Such a polypropylene-based aqueous dispersion can be prepared by dispersing the aforementioned propylene-based polymer in an aqueous solvent containing a basic material which is optionally used. The dispersion method is not specifically limited. For example, any of grinding method which comprises putting a polypropylene into water with a surface active agent and water to cause dispersion, method which comprises mixing a polypropylene dissolved in an organic solvent with a surface active agent and water, and then removing the organic solvent from the mixture, homomixer method which comprises dispersion using a homomixer, method involving the use of a mixer for emulsification by inner shearing force, phase inversion method, etc. may be used. These methods are properly selected depending on the physical properties of the polypropylene to be dispersed, etc. In particular, the method involving the use of a mixer for emulsification by inner shearing force is preferably used because it can disperse a polypropylene more finely to improve the dispersion stability thereof.

Since the average particle diameter of dispersed particles in the polypropylene-based aqueous dispersion is not greater than 0.5 μm, the polypropylene-based aqueous dispersion exhibits an excellent smoothness and an excellent adhesion to a polyolefin base material. The polypropylene-based aqueous dispersion can more difficultly undergo layer separation to attain further improvement of storage stability to advantage. The lower limit of the average particle diameter is not specifically limited but is normally not smaller than 0.05 μm.

The polypropylene-based aqueous dispersion may comprise a hydrophilic organic solvent other than water incorporated therein for the purpose of raising the drying speed or providing a surface with a good finished appearance. Examples of the hydrophilic organic solvent include alcohols such as methanol and ethanol, ketones such as acetone and methyl ethyl ketone, glycols such as ethylene glycol and propylene glycol, ethers thereof, etc.

Further, the polypropylene-based aqueous dispersion may comprise other aqueous resins such as aqueous acrylic resin, aqueous urethane resin, aqueous epoxy resin, aqueous alkyd resin, aqueous phenol resin, aqueous amino resin, aqueous polybutadiene resin and aqueous silicone resin dispersed therein as necessary. Besides these compounds, various stabilizers such as thickening agent, anti-foaming agent, oxidation inhibitor, weathering stabilizer and heat stabilizer, coloring agents such as titanium oxide and organic pigment, electrically-conducting agents such as carbon black and ferrite, and various additives such as preservative, mildew-proofing agent and rust preventive may be incorporated in the polypropylene-based aqueous dispersion. Further, the polypropylene-based aqueous dispersion may comprise a small amount of an organic solvent incorporated therein to improve the wetting properties with respect to the base material to be coated.

Examples of the thickening agent include alginic acid-based thickening agents such as ammonium alginate and sodium alginate, mineral-based thickening agents such as bentonite clay, acrylic acid-based thickening agents such as sodium polyacrylate, ammonium polyacrylate, acryl emulsion copolymer and bridged acryl emulsion copolymer, fiber derivatives such as carboxy methyl cellulose, methyl cellulose, hydroxypropyl methyl cellulose and hydroxyethyl cellulose, etc.

Examples of the anti-foaming agent include vegetable oils such as castor oil, soybean oil and linseed oil, mineral oils such as spindle oil and liquid paraffin, aliphatic acids such as stearic acid and oleic acid, alcohols such as oleyl alcohol, polyoxyalkylene glycol and octyl alcohol, aliphatic acid esters such as ethylene glycol distearate and polyoxyethylene sorbitan monolaurate, phosphoric acid esters such as tributyl phosphate and sodium octyl phosphate, amides such as polyoxyalkylene amide, metal soaps such as aluminum stearate, potassium oleate and calcium stearate, silicones such as dimethyl silicone and polyether-modified silicone, amines such as dimethylamine and polyoxypropylene alkyl amine, etc.

Examples of the stabilizer include phenolic stabilizers such as 2,6-di-t-butyl-4-methylphenol, tetrakis[methylene (3,5-di-4-hydroxyhydrocinnamate)]methane, metaoctadecyl-3-(4-hydroxy-3,5-di-t-butylphenyl)propionate, 2,2'-methylenebis(4-methyl-6-t-butylphenol), 4,4'-butylidenebis(3-methyl-6-t-butylphenol), 2,2-thibis(4-methyl-6-t-butylphenol), 1,3,5-trimethyl-2,4,6-tris(3,5-di-t-4-hydroxybenzyl)benzene and 1,3,5-tris(2-methyl-4-hydroxy-5-t-butylphenol)butane, sulfur-based stabilizers such as dilaurylthio dipropionate and distearylthio dipropionate, phosphorus-based stabilizers such as tridecyl phosphite and trinonyl phenyl phosphite, etc. Examples of ultraviolet absorbers employable herein include 2-hydroxy-4-octoxybenzophenone, 2-ethylhexyl-2-cyano-3,3-diphenyl acrylate, paraoctylphenyl salicylate, etc.

Such a polypropylene-based dispersion can be used as a primer which is adapted to be applied to the surface of a molded product made of an α-olefin (co)polymer or other polymers as main base material component to improve the coatability thereof such as adhesion of ink and coating compound to the surface of the molded product and water resistance and gasoline resistance thereof. In particular, the aforementioned polyolefin-based aqueous dispersion can be preferably used for molded products made of an α-olefin polymer such as high pressure polyethylene, middle-low pressure polyethylene, polypropylene, poly-4-methyl-1-pentene, poly-1-butene and polystyrene, an α-olefin copolymer such as ethylene-propylene copolymer, ethylene-butene copolymer and propylene-butene copolymer or the like.

The molded product to which the aforementioned polyolefin-based aqueous dispersion can be applied may be obtained by forming the aforementioned various polymers by any of known molding methods such as injection molding, compression molding, hollow molding, extrusion and rotary molding.

As a method for applying the polypropylene-based aqueous dispersion to the surface of the molded product there is preferably used a spray coating method. For example, the polypropylene-based aqueous dispersion may be sprayed onto the surface of the molded product using a spray gun. The application of the polypropylene-based aqueous dispersion to the molded product may be effected at ordinary temperature. The molded product thus coated may be subjected to proper drying such as natural drying and forced drying by heating to form a coat layer.

As mentioned above, the surface of the molded product to which the aqueous dispersion has been applied and dried can be coated with a coating compound by a method such as electrostatic coating, spray coating and brush coating. The application of the coating compound can be carried out by a method involving undercoating followed by finish coating. After the application of the coating compound, the coat layer is then cured by an ordinary method involving heating by a heating wire, infrared ray, high frequency wave or the like to obtain a molded product having a desired coat layer formed on the surface thereof. The method for curing the coat layer can be properly selected depending on the material and shape of the molded product, the properties of the coating compound used, etc.

Further, the propylene-based aqueous dispersion can make the use of its characteristics of excellent adhesion, peel strength and water resistance to find application to a wide range of purposes besides the aforementioned primer. The propylene-based aqueous dispersion can be used as an ink, coating compound or adhesive resin for various molded products, films and sheets made of a polyolefin as a base material.

EXAMPLE

The present invention will be further described in the following examples, but the present invention is not limited thereto so far as they do not deviate from the scope thereof.

The measurement of the molecular weight of the propylene polymer was conducted according to the method described herein.

The melting point of the propylene polymer is measured using a Type TA2000 thermal analysis system produced by Du Pont Inc. in the following manner. The sample (about 5 to 10 mg) was melted at 200° C. for 3 minutes, cooled to 30° C. at a rate of 10° C./min, and then heated to 200° C. at a rate of 10° C./min to obtain a melt curve from which the temperature of the top of main endothermic peak in the last temperature rising step was then determined as melting point.

The measurement of the solubility of the propylene polymer in 98° C. heptane and 25° C. toluene were conducted according to the method described herein.

The interlayer adhesion test was conducted according to the checkerboard test method defined in JIS K5400. A test specimen having a checkerboard formed thereon was prepared. A cellophane tape produced by NICHIBAN CO., LTD. was stuck to the checkerboard on the test specimen. The cellophane tape was then rapidly pulled at an right angle and peeled. The number of checkers left unpeeled out of 100 checkers was then counted to give an index of adhesion.

Further, in the following examples, the catalyst synthesis step and the polymerization step were both effected in an atmosphere of purified nitrogen. The solvent was dehydrated through a molecular sieve (MS-4A), and then subjected to bubbling and deaeration with purified nitrogen before use.

Example 1

(i) Synthesis of dichloro[dimethylsilylene(cyclopentadienyl)(2,4-dimethyl-4H-1-azulenyl)hafnium (i)-1 Synthesis of Ligands 2-Methylazulene (4.01 g) was dissolved in tetrahydrofurane (56 ml), and then cooled to 0° C. over an ice bath. At the same temperature, to the solution was then added dropwise 24.8 ml of a diethylether solution (1.14 mol/l) of methyllithium. After the termination of dropwise addition, the mixture was then stirred for two hours outside the ice bath. This solution was then slowly added dropwise to a tetrahydrofurane solution (140 ml) of dimethylsilyl dichloride (34.0 ml, 0.280 mol) which had been cooled to 0° C. over an ice bath. After the termination of dropwise addition, the mixture was then stirred for 3 hours outside the ice bath. Thereafter, the solvent and the unreacted dimethylsilyl dichloride were distilled off under reduced pressure. To the residue was then added tetrahydrofurane (80 ml). The mixture was then cooled to 0° C. To the mixture was then gradually added dropwise cyclopentadienyl sodium (2.1 mol/l, 26.9 ml, 56.5 mmol). After the termination of dropwise addition, the mixture was then stirred at room temperature for 12 hours. After the termination of stirring, to the solution was then added water. To the solution was then added diethyl ether to extract the desired compound. The solution thus extracted was dehydrated over magnesium sulfate, and then dried to obtain an unpurified product of the desired ligand. The unpurified product was then purified through a silica gel column chromatography with n-hexane as an elutant to obtain the desired ligand (6.29 g) in a yield of 79%.

(i)-2 Synthesis of Complex

The ligand (6.29 g) obtained in (i)-1 was dissolved in tetrahydrofurane (100 ml), and then cooled to 0° C. over an ice bath. At the same temperature, to the solution was then slowly added dropwise an n-hexane solution (1.56 mol/l, 28.4 ml) of n-butyllithium. After the termination of dropwise addition, the mixture was then stirred for 3 hours outside the ice bath. The solvent was then distilled off under reduced pressure. To the distillation residue was then added toluene (60 ml). The mixture was then cooled to −78° C. To the mixture was then slowly added a toluene suspension (140 ml) of hafnium tetrachloride (7.17 g) which had been cooled to −78° C. Thereafter, the mixture was stirred overnight outside the cooling bath. After the termination of stirring, the reaction solution was then filtered through a G3 frit. The solid material on the frit was washed with toluene. The filtrate was then concentrated to obtain a brown powder. The brown powder was then subjected to extraction with hot n-hexane (180 ml) by three times to extract the desired complex. The solution thus extracted was dried. The solid material thus obtained was subjected to suspension cleaning with n-hexane (20 ml) by five times, and then dried under reduced pressure to obtain the desired dichloro[dimethylsilylene(cyclopentadienyl)(2,4-dimethyl-4H-1-azulenyl) hafnium (2.90 g) (yield: 25%).

$^1$H-NMR (CDCl$_3$): δ0.85 (s, 3H), 0.86 (s, 3H), 1.47 (d, J=7.1 Hz, 3H), 2.25 (s, 3H), 3.42–3.52 (m, 1H), 5.42 (dd, J=4.7, 10.1 Hz, 1H), 5.80–5.85 (m, 2H), 5.90–5.95 (m, 1H), 6.16–6.20 (m, 2H), 6.65 (d, J=11.4H), 6.80–6.85 (m, 1H), 6.98–7.02 (m, 1H).

(ii) Chemical Treatment of Clay Mineral

In a 1,000 ml round flask were measured out desalted water (110 ml), magnesium sulfate heptahydrate (22.2 g) and sulfuric acid (18.2 g) which were then dissolved with stirring. In the solution was then dispersed a commercially available granulated montmorillonite (Benclay S L, produced by Mizusawa Chemical Industry Co., Ltd.; 16.7 g). The dispersion was then heated to 100° C. in 2 hours. The dispersion was then stirred at 100° C. for 2 hours. Thereafter, the dispersion was cooled to room temperature in 1 hour. The slurry thus obtained was then filtered to recover a wet cake. The cake thus recovered was again slurried with desalted water (500 ml) in a 1,000 ml round flask, and then filtered. This procedure was performed twice. The finally obtained cake was then dried at 110° C. in a nitrogen atmosphere overnight to obtain chemically-treated montmorillonite (13.3 g).

(iii) Polymerization

To the chemically-treated montmorillonite (0.44 g) obtained in (ii) above was then added a toluene solution (0.4 mmol/ml, 2.0 ml) of triethyl aluminum. The mixture was then stirred at room temperature for 1 hour. To the suspension was then added toluene (8 ml). The mixture was then stirred. The supernatant liquid was then removed. This procedure was then performed twice. To the solution was then added toluene to obtain a clay slurry (slurry concentration=99 mg clay/ml).

In another flask was measured out triisobutyl aluminum (0.114 mmol) produced by TOSOH AKZO CO., LTD. To the material were then added the clay slurry (3.8 ml) thus obtained and a solution of the complex (6.02 mg, 11.4 µmol) obtained in (i)-2 above diluted with toluene. The mixture was then stirred at room temperature for 10 minutes to obtain a catalyst slurry.

Subsequently, into an induction-agitated autoclave having an inner capacity of 2 liter were introduced toluene (750 ml), triisobutyl aluminum (1.9 mmol) and liquid propylene (180 ml). At room temperature, the aforementioned catalyst slurry was totally introduced into the autoclave. The content of the autoclave was then heated to 60° C. where it was then stirred for 1 hour. After the termination of stirring, the unreacted propylene was then purged. The polymerization was then suspended. The autoclave was then opened to recover a part of the toluene solution of polymer from which the solvent and the clay residue were then removed to obtain 6.8 g of a propylene polymer.

The polymer thus obtained was then analyzed. The following results were obtained.

Mw by GPC: 110,000

Peak derived from carbon atom in a methyl group in a propylene unit chain formed by head-to-tail bond by 13C-NMR: ratio of $S_5$ to S=36.4(%), $4+2S_5/S_6$=8.8

Ratio of 2,1-insertion to all propylene insertions measured by $^{13}$C-NMR: 0.61(%)

Ratio of 1,3-insertion to all propylene insertions measured by $^{13}$C-NMR: 0.63(%)

When the polymer was subjected to temperature rise elution fraction with orthodichlorobenzene, the polymer was totally eluted at 45° C. DSC was measured. As a result, no definite melt peaks were observed.

(iv) Evaluation of Physical Properties

The propylene polymer obtained in (iii) above was dissolved in heptane at 98° C. and toluene at 25° C. to prepare 10 wt-% solutions. The propylene polymer exhibited a good solubility in all the solvents. No insoluble contents were present. The toluene solution thus obtained was applied to an injected piece of a Type MA3U high crystallinity polypropylene produced by JAPAN POLYCHEM CO., LTD. (cleaned with isopropyl alcohol on the surface thereof) (coated amount: 6.7 g/m$^2$), treated at 90° C. for 30 minutes, and then evaluated for adhesion of the coat layer thus formed. The coat layer thus obtained exhibited an excellent surface smoothness and no stickiness. As a result of the checkerboard test, no checkers were peeled. The propylene polymer also exhibited a good adhesion to MA3U, which is a base material.

Example 2

(1) Polymerization

The polymerization procedure of (iii) of Example 1 was followed except that the total pressure during polymerization was kept constant at 0.7 MPa and the polymer obtained by polymerization was totally recovered. As a result, 23.2 g of a propylene polymer was obtained.

The polymer thus obtained was then analyzed. The following results were obtained.

Mw by GPC: 110,000

Peak derived from carbon atom in a methyl group in a propylene unit chain formed by head-to-tail bond by $^{13}$C-NMR: ratio of $S_5$ to S=41.1(%), $4+2S_5/S_6$=9.0

Ratio of 2,1-insertion to all propylene insertions measured by $^{13}$C-NMR: 0.52(%)

Ratio of 1,3-insertion to all propylene insertions measured by $^{13}$C-NMR: 0.61(%)

When the polymer was subjected to temperature rise elution fraction with orthodichlorobenzene, the polymer was totally eluted at 55° C. DSC was measured. As a result, no definite melt peaks were observed.

The propylene polymer thus obtained was dissolved in heptane at 98° C. and toluene at 25° C. to prepare 10 wt-% solutions. The propylene polymer exhibited a good solubility in all the solvents. No insoluble contents were present.

(2) Modification of Propylene Polymer with Maleic Anhydride

Into a stainless steel pressure vessel with a thermometer and an agitator were charged toluene (200 ml) and the propylene polymer (20 g) obtained in (1) above. The air in the vessel was then replaced by nitrogen gas. The content of the vessel was then heated to 125° C. After the temperature rise, a toluene solution (0.1 g/ml) of maleic anhydride and a toluene solution (0.015 g/ml) of dicumyl peroxide were supplied into the vessel through separate pipes for 6 hours using a pump. Finally, 1.2 g of maleic anhydride and 0.18 g of dicumyl peroxide were supplied into the system to cause reaction. After the termination of the reaction, the system was then cooled close to room temperature. To the reaction mixture was then added acetone. The polymer thus precipitated was then filtered. The precipitation and filtration with acetone was performed further. The finally obtained polymer was then washed with acetone. The polymer thus washed was then dried under reduced pressure to obtain a modified resin in the form of white powder. The modified resin was then subjected to measurement of infrared absorption spectrum and titration to neutralization. As a result, it was found that the content of maleic anhydride group is 1.0% by weight.

To 15 g of the maleic anhydride-modified propylene polymer thus obtained was then added 135 g of toluene. The mixture was then heated to 100° C. so that it was dissolved in 1 hour. The solution thus obtained was cooled close to room temperature, and then passed through a #400 SUS metal gauge to prepare a 10 wt-% solution of the maleic anhydride-modified propylene polymer.

(3) Evaluation of Physical Properties of Modified Propylene Polymer

The toluene solution of maleic anhyride-modified propylene polymer obtained in (2) above was spray-coated onto an injected piece of a Type MA3U high crystallinity polypropylene produced by JAPAN POLYCHEM CO., LTD. (cleaned with isopropyl alcohol on the surface thereof). The coated amount was from 3 to 5 g/m$^2$. Subsequently, this molded piece was allowed to stand at 25° C. for 1 hour, and then dried at 80° C. in a safety valve dryer. Subsequently, the dried product was allowed to stand at 25° C. for 1 hour. A base coat prepared by incorporating a predetermine amount of a curing agent in a Type PG80III acryl polyol urethane coating compound (trade name, produced by KANSAI PAINT CO., LTD.) and then adjusting the viscosity of the mixture with a dedicated thinner using a #4 ford cup to a range of from 12 to 13 seconds was then spray-coated onto the coat layer in a dried coated amount of from 50 to 60 g. The coated material was then baked at 100° C. in a safety valve dryer for 30 minutes. The coated material was allowed to stand at 25° C. for 10 days, and then subjected to interlayer adhesion test. As a result of the test, there were no peeled checkers. Thus, the maleic anhydride-modified propylene polymer obtained in (2) above exhibited an excellent adhesion to both the high crystallinity polypropylene, which is a base material, and the base coating compound. Further, the coat layer showed no stickiness.

Example 3

(i) Polymerization

To the chemically-treated montmorillonite (1.02 g) obtained in (ii) of Example 1 was added a toluene solution (0.45 mmol/ml, 4.5 ml) of triethyl aluminum. The mixture was then stirred at room temperature for 1 hour. To the suspension was then added toluene (40 ml). The mixture was then stirred. The supernatant liquid was then removed. This procedure was then performed twice. To the solution was then added toluene to obtain a clay slurry.

In another flask was measured out triisobutyl aluminum (0.08 mmol) produced by TOSOH AKZO CO., LTD. To the material was then added a solution of the complex (3.86 mg, 7.45 μmol) obtained in (i)-2 above diluted with toluene. The mixture was then stirred at room temperature for 5 minutes. The total amount of this complex solution was then added to the aforementioned clay slurry. The mixture was then stirred at room temperature for 40 minutes to obtain a catalyst slurry.

Subsequently, into an induction-agitated autoclave having an inner capacity of 2 litter were introduced triisobutyl aluminum (0.25 mmol) and the total amount of the aforementioned catalyst slurry. At 25° C., liquid propylene (1,250 ml) was introduced in the autoclave and further ethylene was introduced thereinto to an ethylene partial pressure of 0.70 MPa. The content of the autoclave was then heated to 60° C. where it was then stirred for 1 hour. After the termination of stirring, the unreacted monomer was then purged. The polymerization was then suspended. When the autoclave was then opened, 144 g of a propylene-ethylene copolymer was obtained. The polymer thus obtained was then analyzed. The following results were obtained.

Mw by GPC: 91,000

Peak derived from carbon atom in a methyl group in a propylene unit chain formed by head-to-tail bond by $^{13}$C-NMR: ratio of $S_5$ to S=35.7(%), $4+2S_5/S_6$=8.8

Ratio of 2,1-insertion to all propylene insertions measured by $^{13}$C-NMR: 2.5(%)

Ratio of 1,3-insertion to all propylene insertions measured by $^{13}$C-NMR: 0.3(%)

Further, $(S_1+S_2)/(S_1+S_2+S_30.5S_4)$ was 0.004.

In $^{13}$C-NMR spectrum, no signals were observed at 27.3 ppm, 30.0 ppm and 33.5 ppm.

The polymer thus obtained was measured for DSC. As a result, no definite melt peaks were observed.

The polymer was subjected to temperature rise elution fraction with orthodichlorobenzene. As a result, the polymer was eluted by 79.5% by weight thereof at 5° C. and totally at 85° C.

(ii) Evaluation of Physical Properties

The propylene-ethylene copolymer obtained in (i) above was dissolved in heptane at 98° C. and toluene at 25° C. to prepare 10 wt-% solutions. The propylene-ethylene copolymer exhibited a good solubility in all the solvents. No insoluble contents were present. The propylene-ethylene copolymer was evaluated for adhesion of coat layer in the same manner as in (iv) of Example 1. The coat layer thus obtained exhibited an excellent surface smoothness and no stickiness. As a result of the checkerboard test, no checkers were peeled. The propylene-ethylene copolymer also exhibited a good adhesion to MA3U, which is a base material.

Example 4

(i) Chemical Treatment of Clay Mineral

In a 1,000 ml round flask were measured out desalted water (72 ml), magnesium sulfate heptahydrate (11.2 g) and sulfuric acid (17.0 g) which were then dissolved with stirring. In the solution was then dispersed a commercially available granulated montmorillonite (Benclay S L, produced by Mizusawa Chemical Industry Co., Ltd.; 22.0 g). The dispersion was then heated to 100° C. The dispersion was then stirred for 5 hours. Thereafter, the dispersion was cooled to room temperature in 1 hour. The slurry thus obtained was then filtered to recover a wet cake. The cake thus recovered was again slurried with desalted water (500 ml) in a 1,000 ml round flask, and then filtered. This procedure was performed twice. The finally obtained cake was then dried at 200° C. in a nitrogen atmosphere under reduced pressure for 1 hour to obtain chemically-treated montmorillonite (15.6 g).

(iii) Polymerization

To the chemically-treated montmorillonite (0.65 g) obtained in (i) above was then added a toluene solution (0.5 mmol/ml, 2.6 ml) of triethyl aluminum. The mixture was then stirred at room temperature for 1 hour. To the suspension was then added toluene (15 ml). The mixture was then stirred. The supernatant liquid was then removed. This procedure was then performed twice. To the solution was then added toluene to obtain a clay slurry.

In another flask was measured out triisobutyl aluminum (0.08 mmol) produced by Nippon Aluminum Alkyls, Ltd. To the material was then added a solution (7.0 ml) of the complex (10.1 mg, 19.5 µmol) obtained in (i)-2 of Example 1 diluted with toluene. The mixture was then stirred at room temperature for 5 minutes. The total amount of this complex solution was then added to the aforementioned clay slurry. The mixture was then stirred at room temperature for 10 minutes to obtain a catalyst slurry.

Subsequently, into an induction-agitated autoclave having an inner capacity of 5 litter were introduced triisobutyl aluminum (0.32 mmol), toluene (2,750 ml) and the total amount of the aforementioned catalyst slurry. At 25° C., liquid propylene (660 ml) was then introduced into the autoclave. Further, ethylene was introduced into the autoclave to an ethylene partial pressure of 0.05 MPa. The content of the autoclave was then heated to 80° C. Stirring was then continued at the same temperature for 1 hour while propylene was being successively added such that the total pressure in the vessel reached a constant value of 0.85 MPa. After the termination of stirring, the unreacted monomer was then purged. The polymerization was then suspended. The autoclave was then opened. To the reaction solution thus obtained was then added water to deactivate the catalyst and the organic aluminum. To the reaction solution was then added anhydrous magnesium sulfate so that it was dried. The reaction solution was then filtered to remove insoluble matters. The filtrate was then concentrated under reduced pressure to obtain 467 g of a propylene-ethylene copolymer.

The polymer thus obtained was then analyzed. The following results were obtained.

Mw by GPC: 38,000

Peak derived from carbon atom in a methyl group in a propylene unit chain formed by head-to-tail bond by $^{13}$C-NMR: ratio of $S_5$ to S=34.4(%), $4+2S_5/S_6$=8.1

Ratio of 2,1-insertion to all propylene insertions measured by $^{13}$C-NMR: 0(%)

Ratio of 1,3-insertion to all propylene insertions measured by $^{13}$C-NMR: 1.2(%)

Further, $(S_1+S)/(S_1+S_2+S_3+0.5S_4)$ was 0.004.

In $^{13}$C-NMR spectrum, no signals were observed at 27.3 ppm, 30.0 ppm and 33.5 ppm.

The polymer thus obtained was measured for DSC. As a result, no definite melt peaks were observed.

(iii) Evaluation of Physical Properties

The propylene-ethylene copolymer obtained in (ii) above was dissolved in heptane at 98° C. and toluene at 25° C. to prepare 10 wt-% solutions. The propylene-ethylene copolymer exhibited a good solubility in all the solvents. No insoluble contents were present. The propylene-ethylene copolymer was also evaluated for adhesion of coat layer in the same manner as in (iv) of Example 1. The coat layer thus obtained exhibited an excellent surface smoothness and no stickiness. As a result of the checkerboard test, no checkers were peeled. The propylene-ethylene copolymer also exhibited a good adhesion to MA3U, which is a base material.

Example 5

(i) Polymerization

To the chemically-treated montmorillonite (0.12 g) obtained in (i) of Example 4 was added a toluene solution (0.5 mmol/ml, 0.5 ml) of triethyl aluminum. The mixture was then stirred at room temperature for 1 hour. To the suspension was then added toluene (3 ml). The mixture was then stirred. The supernatant liquid was then removed. This procedure was then performed twice. To the solution was then added toluene to obtain a clay slurry.

In another flask was measured out triisobutyl aluminum (0.008 mmol) produced by Nippon Aluminum Alkyls, Ltd. To the material was then added a solution (0.63 ml) of the complex (2.0 mg, 3.8 µmol) obtained in (i)-2 of Example 1 diluted with toluene. The mixture was then stirred at room temperature for 5 minutes. The total amount of this complex solution was then added to the aforementioned clay slurry. The mixture was then stirred at room temperature for 10 minutes to obtain a catalyst slurry.

Subsequently, into an induction-agitated autoclave having an inner capacity of 5 litter were introduced triisobutyl aluminum (0.13 mmol), toluene (1,100 ml) and the total amount of the aforementioned catalyst slurry. At 25° C., liquid propylene (260 ml) was then introduced into the autoclave. Ethylene was then introduced into the autoclave to an ethylene partial pressure of 0.05 MPa. The content of the autoclave was then heated to 80° C. A mixture of ethylene and hydrogen was then supplied from a separately prepared buffer tank at a regular interval of 15 minutes until the pressure reduction in the buffer tank reached 50 kPa. The molar ratio of ethylene and hydrogen in the buffer tank was 9:1. At the same time, propylene was successively supplied into the autoclave such that the total pressure in the autoclave reached a constant value of 0.85 MPa. Stirring was then continued at 80° C. for 1 hour. After the termination of stirring, the unreacted propylene was then purged. The polymerization was then suspended. The autoclave was then opened. To the reaction solution thus obtained was then added water to deactivate the catalyst and the organic aluminum. To the reaction solution was then added anhydrous magnesium sulfate so that it was dried. The reaction solution was then filtered to remove insoluble matters. The filtrate was then concentrated under reduced pressure to obtain 185 g of a propylene-ethylene copolymer.

The polymer thus obtained was then analyzed. The following results were obtained.

Mw by GPC: 30,000

Peak derived from carbon atom in a methyl group in a propylene unit chain formed by head-to-tail bond by $^{13}$C-NMR: ratio of $S_5$ to $S=33.9(\%)$, $4+2S_5/S_6=7.7$ Ratio of 2,1-insertion to all propylene insertions measured by $^{13}$C-NMR: 0(%)

Ratio of 1,3-insertion to all propylene insertions measured by $^{13}$C-NMR: 0.78(%)

Further, $(S_1+S_2)/(S_1+S_2+S_3+0.5S_4)$ was 0.036.

In $^{13}$C-NMR spectrum, no signals were observed at 27.3 ppm, 30.0 ppm and 33.5 ppm.

The polymer thus obtained was measured for DSC. As a result, no definite melt peaks were observed.

(ii) Evaluation of Physical Properties

The propylene polymer obtained in (i) above was dissolved in heptane at 98° C. and toluene at 25° C. to prepare 10 wt-% solutions. The propylene polymer exhibited a good solubility in all the solvents. No insoluble contents were present. The propylene polymer was also evaluated for adhesion of coat layer in the same manner as in (iv) of Example 1. The coat layer thus obtained exhibited an excellent surface smoothness and no stickiness. As a result of the checkerboard test, no checkers were peeled. The propylene polymer also exhibited a good adhesion to MA3U, which is a base material.

Example 6

(i) Polymerization

In a 20 ml eggplant type flask was measured out the complex (20 mg) obtained in (i)-2 of Example 1. To the content of the flask was then added triisobutyl aluminum (0.5 mmol/ml, 0.13 ml). The mixture was then stirred at room temperature for 0.5 hours. To the complex solution was then added toluene (2.7 ml) to obtain a complex solution.

Separately, in a 100 ml eggplant type flask was measured out the chemically-treated montmorillonite (1.0 g) obtained in (ii) of Example 1. To the chemically-treated montmorillonite was added a toluene solution (0.5 mmol/ml, 4.0 ml) of triisobutyl aluminum. The mixture was then stirred at room temperature for 0.5 hours. To the suspension was then added toluene (25 ml). The mixture was then stirred. The supernatant liquid was then removed. This procedure was then performed again. To the solution was then added toluene to obtain a clay slurry. To the clay slurry thus obtained was then added 2.5 ml of the aforementioned complex solution to obtain a catalyst slurry.

Subsequently, into an induction-agitated autoclave having an inner capacity of 24 litter was charged 13 l of toluene at room temperature. The content of the autoclave was then heated to 50° C. At the same temperature, triisobutyl aluminum (1.5 mmol) and the total amount of the aforementioned catalyst slurry were then introduced into the autoclave with stirring. Propylene (1,600 g) was then introduced into the autoclave to initiate polymerization. During the polymerization, propylene was properly introduced into the autoclave such that the total pressure in the autoclave reached a constant value of 0.65 MPa. At the same temperature, polymerization was effected for 2 hours. Methanol (13 ml) was then added to suspend the polymerization. The unreacted monomer was then purged. The autoclave was then opened. The content was then withdrawn from the autoclave. Toluene was then removed under reduced pressure to obtain 1,439 g of a propylene polymer.

The polymer thus obtained was then analyzed. The following results were obtained.

Mw by GPC: 240,000

Peak derived from carbon atom in a methyl group in a propylene unit chain formed by head-to-tail bond by $^3$C-NMR: ratio of $S_5$ to $S=49.0(\%)$, $4+2S_5/S_6=10.5$ Ratio of 2,1-insertion to all propylene insertions measured by $^{13}$C-NMR: 0.01(%)

Ratio of 1,3-insertion to all propylene insertions measured by $^{13}$C-NMR: 0.34(%)

The polymer thus obtained was measured for DSC. As a result, no definite melt peaks were observed. The polymer was measured for crystallinity by wide angle X-ray diffractometry. The crystallinity was found to be 19%.

(2) Modification of Propylene Polymer

In a glass flask equipped with a thermometer, a condenser, an agitator and a dropping funnel were charged the propylene polymer (300 g) synthesized in (1) above and toluene (900 g). In a nitrogen atmosphere, the temperature in the system was raised to 85° C. to cause the propylene polymer to be dissolved in toluene. Subsequently, to the propylene solution was added dropwise a solution of maleic anhydride (15 g) and benzoyl peroxide (5 g) in toluene (300 g) at the same temperature in 1 hour. The reaction mixture was then allowed to undergo ripening reaction for 5 hours. After the termination of reaction, the reaction solution was then cooled close to room temperature. The reaction solution was then put into 4.5 kg of acetone. The maleic anhydride-modified polypropylene thus precipitated was then withdrawn by filtration. The modified resin was again put into 4.5 kg of acetone so that it was purified, withdrawn by filtration, and then dried in vacuo. The resulting modified resin in the form of white powder was then measured for infrared absorption spectrum. As a result, the content of maleic anhydride group was found to be 0.5% by weight.

(3) Preparation of Aqueous Dispersion

Into a glass flask equipped with a thermometer, a condenser and an agitator were charged the aforementioned maleic anhydride-modified polypropylene (100 g) and toluene (400 g). The mixture was then heated to 100° C. to cause the maleic anhydride-modified polypropylene to be dissolved in toluene. The solution was then cooled to 70° C. To the solution were then added a polyoxyethylene cetyl ether (Emulgen 220, produced by Kao Corp., HLB=14.2, 30 g) as a nonionic surface active agent and 30 g of a polyoxyethylene lauryl ether (Emulgen 147, produced by Kao Corp., HLB=16.3) as a nonionic surface active agent to make a solution which was then cooled close to room temperature. The solution was then transferred to a beaker into which water (700 g) was then added in portions of small amount with thorough stirring. Using an inner shearing type emulsifying machine (Clear Mix CLM-0.8S, produced by Mtechnique Co., Ltd.), the mixture was then subjected to emulsification at 21,000 rpm for 15 minutes. Subsequently, to the system was added 2.1 g of an aqueous solution obtained by diluting 2-amino-2-methyl-1-propanol with water to 10% by weight as a basic substance to adjust the pH value of the solution to 8. Toluene was then distilled off the coarse emulsion using an evaporator to obtain an aqueous dispersion of a maleic anhydride-modified polypropylene. The dispersed particles in the aqueous dispersion were then measured for diameter using a laser diffraction type particle diameter distribution meter (Microtrack UPA, produced by NIKKISO Co., Ltd.). The average particle diameter of the dispersed particle was found to be 0.25 µm.

(4) Adhesion Test on Aqueous Dispersion

Firstly, a test specimen was prepared as follows. To a mixture of a polypropylene-based copolymer (60 parts by weight) produced by NIPPON POLYCHEM CO., LTD., an ethylene-propylene random copolymer rubber (30 parts by weight) produced by JSR and talc (10 parts by weight) produced by FUJI TALC CO., LTD. was added tetrakis [methylene-3-(3',5'-di-t-butyl-4'-hydroxy-phenyl) propionate]methane (IRGANOX 1010, produced by Ciba Geigy Inc.; 0.1 parts by weight) as an oxidation inhibitor. The mixture was then stirred by a Henschel mixer for 5 minutes. Thereafter, using a twin-screw kneader (KCM50) produced by KOBE STEEL, LTD., the mixture was then kneaded and granulated at a predetermined temperature of 210° C. to obtain a thermoplastic resin composition. This composition was molded at a predetermined molding temperature of 220° C. using an injection molding machine (Toshiba IS170) produced by TOSHIBA MACHINE CO., LTD. to obtain a scaly test specimen having a size of 150 mm×70 mm×2 mm.

The adhesion test was conducted as follows. The surface of the aforementioned test specimen was cleaned with isopropyl alcohol. The aforementioned aqueous dispersion which had been adjusted to a solid content of 20% by weight was then spray-coated onto the surface of the test specimen in an amount of from 6 to 8 g/m². Subsequently, the coated test specimen (coated plate) was allowed to stand at 25° C. for 1 hour, and then dried at 100° C. in a safety valve drier for 30 minutes. The test specimen was further allowed to stand at 25° C. for 1 hour. An acryl polyol urethane coating compound (RETAN PG80III, produced by KANSAI PAINT CO., LTD.) which had comprised a predetermined amount of a curing agent incorporated therein and had been adjusted with a dedicated thinner for viscosity was then spray-dried onto the coat layer in a coated amount of from 50 to 60 g/m².

The coated test specimen was then baked at 100° C. in a safety valve drier for 30 minutes. Subsequently, the coated test specimen was allowed to stand at 25° C. for 10 days.

The coated plate thus obtained was then marked with a checkerboard according to the method for checkerboard test defined in JIS K5400 to prepare a test specimen. A cellophane tape produced by NICHIBAN CO., LTD. was stuck to the checkerboard on the test specimen, and then rapidly pulled and peeled off in the direction of 90°. As a result, the number of checkers left unpeeled out of 100 checkers on the coated plate was 100.

(5) Water Resistance Test on Aqueous Dispersion

A coated plate which had been prepared in the same manner as in the adhesion test was dipped in 40° C. warm water for 10 days, and then visually judged for external appearance of coat layer. As a result, no abnormalities were recognized. The test specimen was also subjected to checkerboard peel test in the same manner as in the adhesion test. As a result, the number of checkers left unpeeled out of the 100 checkers was 100.

(6) Gasohol Resistance Test on Aqueous Dispersion

A coated plate which had been prepared in the same manner as in the adhesion test was dipped in a mixture of regular gasoline and ethanol (weight ratio: regular gasoline/ ethanol=9/1) which had been kept at 20° C. Then, the time required until the coat layer underwent exfoliation was measured. Even after 120 minutes of dipping, no exfoliation was recognized. Therefore, the test was terminated at this point.

Comparative Example 1

(1) Synthesis of racemate of dichloro {1,1'-dimethylsilylenebis[2-ethyl-4-(2-fluoro-4-biphenylyl)-4H-azulenyl]}hafnium 2-Fluoro-4-bromobiphenyl (6.35 g, 25.3 mmol) was dissolved in a mixture of diethyl ether (50 ml) and n-hexane (50 ml). To the solution was then added dropwise an n-pentane solution (33 ml, 50.6 mmol, 1.54 N) of t-butyllithium at −78° C. The mixture was then stirred at −10° C. for 2 hours. To this solution was then added 2-ethyl azulene (3.55 g, 22.8 mmol). The mixture was then stirred at room temperature for 2 hours. To the solution was then added n-hexane (30 ml). The supernatant liquid was then removed by decantation. This procedure was then performed once again. To the yellow precipitation thus obtained were then added n-hexane (30 ml) and tetrahydrofuran (40 ml) at 0° C. Subsequently, to the mixture were added N-methyl imidazole (50 µl) and dimethyl dichlorosilane (1.4 ml, 11.4 mmol). The mixture was heated to room temperature where it was then stirred for 1 hour. Thereafter, to the solution was added diluted hydrochloric acid. The solution was then subjected to separation. The resulting organic phase was dried over magnesium sulfate, and then subjected to removal of solvent by distillation under reduced pressure to obtain a crude product of dimethylsilylene(2-ethyl-4-(2-fluoro-4-biphenyl)-1,4-dihydroazulene) (8.3 g).

Subsequently, the crude product thus obtained was dissolved in diethyl ether (30 ml). To the solution was then added dropwise an n-hexane solution (14.9 ml, 22.8 mmol, 1.53 N) of n-butyl lithium at −70° C. The temperature of the mixture was gradually raised to room temperature where it was then stirred overnight. To the solution was then added toluene (200 ml). The mixture was then cooled to −70° C. To the mixture was then added hafnium tetrachloride (3.6 g, 11.4 mmol). The temperature of the mixture was gradually raised to room temperature where it was then stirred for four hours. Most of the solvent was then distilled off the slurry thus obtained under reduced pressure. To the residue was then added diethyl ether (50 ml). The slurry thus obtained was then filtered. When the material thus recovered was then washed with diethyl ether (5 ml×2), ethanol (15 ml×2) and n-hexane (10 ml×2), a racemi-meso mixture of dichloro{1,1'-dimethylsilylenebis[2-ethyl-4-(2-fluoro-4-biphenylyl)-4H-azulenyl]}hafnium was obtained (4.53 g, yield of 42%). The racemi-meso mixture was then analyzed by $^1$N-NMR. As a result, the racemi-meso mixture was found to be a mixture of 76.6% of racemate and 23.4% of meso form.

The racemi-meso mixture (4.5 g) thus obtained was suspended in dichloromethane (35 ml), and then irradiated with light from a high pressure mercury vapor lamp (100 W) for 1 hour. The solvent was then distilled off under reduced pressure. To the solid matter thus obtained were then added toluene (25 ml) and dichloromethane (11 ml). The mixture was then heated to 60° C. to obtain a uniform solution. Dichloromethane was then distilled off under reduced pressure to cause crystallization. The crystal thus obtained was filtered, washed with hexane (5 ml) twice, and then dried under reduced pressure to obtain a racemate (1.79 g).

(2) Chemical Treatment of Clay Mineral

Into a 500 ml round flask were charged 55.85 g of desalted water, 32.70 g of sulfuric acid and 8.01 g of lithium hydroxide which were then stirred. To the solution was then added 51.65 g of montmorillonite (Mizusawa Smectite, produced by Mizusawa Chemical Industry Co., Ltd.). The mixture was heated under reflux for 140 minutes. To the residue was then added 300 ml of desalted water. The solution was then filtered with suction. The resulting solid content was then dispersed in 600 ml of desalted water. The dispersion was then filtered with suction. This procedure was then performed once again. The residue obtained by filtration was then dried at 100° C. to obtain montmorillonite treated with acid and metal salt.

1.05 g of the acid- and metal salt-treated montmorillonite thus obtained was measured out in a 100 ml round flask, and then heated and dried at 200° C. under reduced pressure for 2 hours. To the montmorillonite thus dried was then added 4,0 ml of a toluene solution (0.5 mmol/ml) of triethyl aluminum in the presence of purified nitrogen. The mixture was reacted at room temperature for 30 minutes, and then washed with 30 ml of toluene twice to obtain a toluene slurry containing chemically-treated montmorillonite.

(3) Preliminary Polymerization

The slurry (solid content: 914.2 mg) obtained in (2) above was freed of toluene to have a residual toluene content of 1.0 ml. To the slurry was then added a toluene solution (0.5 mmol/l, 0.5 ml) of triisobutyl aluminum. To the slurry was then added the toluene solution (3.0 mmol/l, 9.2 ml) of a racemate of dichloro{1,1'-dimethylsilylenebis[2-ethyl-4-(2-fluoro-4-biphenylyl)-4H-azulenyl])}hafnium synthesized in (1) above. The mixture was then stirred at room temperature for 1 hour to obtain a catalyst slurry.

Into a 2 litter induced agitation type autoclave were then introduced 40 ml of toluene and the total amount of the aforementioned catalyst slurry in the presence of purified nitrogen. Into the autoclave was then introduced 11.0 g of propylene with stirring. The reaction mixture was subjected to preliminary polymerization at 30° C. for 2 hours and then at 50° C. for 0.5 hours. After the preliminary polymerization, the unreacted propylene was then purged. Purified nitrogen was then twice pressed into the autoclave at 0.5 MPa to replace the air in the autoclave. Thereafter, the preliminary polymerization catalyst was withdrawn. This product contained a polymer in an amount of 9.7 g per g of chemically-treated montmorillonite component.

(4) Polymerization

The air in a 2 litter induced agitation type autoclave having an anchor-shaped agitating blade was replaced by purified nitrogen. Subsequently, into the autoclave was charged 750 g of liquefied propylene at 25° C. At the same temperature, a toluene solution (0.1 mmol/ml, 5.0 ml) of triisobutyl aluminum was then pressed into the autoclave. The solution was then heated to 70° C. Hydrogen was then introduced into the autoclave to a gas phase hydrogen concentration of 0.2 mol-%. At 70° C., to the solution was then added the preliminary polymerization catalyst obtained in (3) above as a chemically-treated montmorillonite component in an amount of 30.0 mg to initiate polymerization. After 1 hour, the unreacted propylene was then purged. The polymerization was suspended. The amount of the propylene-based polymer thus obtained was 384 g.

The polymer thus obtained was then analyzed. The following results were obtained.

Mw by GPC: 110,000

In the peak derived from carbon atom in a methyl group in a propylene unit chain formed by head-to-tail bond by $^{13}$C-NMR, the ratio of $S_5$ to S is greater than 99.9(%), and little peaks derived from other pentads were observed.

Ratio of 2,1-insertion to all propylene insertions measured by $^{13}$C-NMR: 0.11(%)

Ratio of 1,3-insertion to all propylene insertions measured by $^{13}$C-NMR: 0.17(%)

Further, $(S_1+S_2)/(S_1+S_2+S_3+0.5S_4)$ was 0.

The polymer was subjected to temperature rise elution fraction with orthodichlorobenzene. As a result, the polymer was totally eluted. The polymer was measured for DSC. As a result, a melt peak was observed at 156.5° C.

(5) Evaluation of Physical Properties

In an attempt to prepare a 10 wt-% solution, the propylene polymer obtained in (4) above were dissolved in 98° C. heptane and 25° C. toluene. However, the polymer was substantially dissolved in neither 98° C. heptane nor 25° C. toluene.

Comparative Example 2

(1) Production of Solid Catalyst Component

Into a 100 litter reaction vessel equipped with an agitating blade, a thermometer, a jacket and a condenser was charged 30 mol of $Mg(OEt)_2$. Subsequently, into the reaction vessel was charged $Ti(OBu)_4$ in such an amount that the molar ratio to magnesium in $Mg(OEt)_2$ thus charged, i.e., $Ti(OBu)_4$/Mg reached 0.60. Into the reaction vessel was then charged 19.2 kg of toluene. The mixture was then heated with stirring. The mixture was then reacted at 139° C. for 3 hours. The reaction mixture was then cooled to 130° C. Into the reaction vessel was then charged a toluene solution of $MeSi(OPh)_3$ in such an amount that the molar ratio to magnesium in $Mg(OEt)_2$ previously charged, i.e., $MeSi(OPh)_3$/Mg reached 0.67. The amount of toluene used herein was 7.8 kg. After the termination of addition, the reaction mixture was then reacted at 130° C. for 2 hours. Thereafter, the reaction mixture was cooled to room temperature where $Si(OEt)_4$ was then added thereto. The amount of $Si(OEt)_4$ thus added was such that the molar ratio to magnesium in $Mg(OEt)_2$ previously charged, i.e., $Si(OEt)_4$/Mg reached 0.056.

Subsequently, to the reaction mixture thus obtained was added toluene (TOL) in such an amount that the magnesium concentration reached 0.58 (mol/L-TOL). To the reaction mixture was then added diethyl phthalate (DEP) in such an amount that the molar ratio to magnesium in Mg(OEt)$_2$ previously charged, i.e., DEP/Mg reached 0.10. The mixture thus obtained was cooled to −10° C. with stirring where TiCl$_4$ was then added dropwise thereto in 2 hours to obtain a uniform solution. The amount of TiCl$_4$ added was such that the molar ratio to magnesium in Mg(OEt)$_2$ previously charged, i.e., TiCl$_4$/Mg reached 4.0. After the addition of TiCl$_4$, the reaction mixture was then heated to 15° C. at a rate of 0.5° C./min with stirring. The reaction mixture was then kept at the same temperature for 1 hour. Subsequently, the reaction mixture was then heated to 50° C. at a rate of 0.5° C./min. The reaction mixture was then kept at the same temperature for 1 hour. Further, the reaction mixture was heated to 118° C. at a rate of 1° C./min. The reaction mixture was then treated at the same temperature for 1 hour. After the termination of treatment, the agitation was suspended. The supernatant liquid was then removed. The residue was then washed with toluene such that the ratio of liquid retention reached 1/73 to obtain a slurry.

Subsequently, to the slurry thus obtained were added toluene and TiCl$_4$ at room temperature. The amount of TiCl$_4$ added was such that the molar ratio to magnesium in Mg(OEt)$_2$ previously charged, i.e., TiCl$_4$/Mg(OEt)$_2$ reached 5.0. The amount of toluene added was such that the concentration of TiCl$_4$ reached 2.0 (mol/L-TOL). The slurry was heated with stirring to 118° C. where it was then reacted for 1 hour. After the termination of reaction, the agitation was then suspended. The supernatant liquid was then removed. The residue was then washed with toluene such that the ratio of liquid retention reached 1/150 to obtain a slurry of solid catalyst component.

(2) Treatment of Solid Catalyst Component

In a 100 ml eggplant type flask was measured out 117.3 mg of the slurry of solid catalyst component obtained in (1) above as a solid catalyst component. To the slurry was then added dropwise 0.27 mmol of triethyl aluminum with stirring at room temperature. After the termination of dropwise addition, the slurry was further stirred at room temperature for 30 minutes.

(3) Polymerization of Propylene

Into an induced agitation type autoclave (capacity: 2 litter) were charged 2.0 mmol of triethyl aluminum and 0.05 mmol of t-BuEtSi(OMe)$_2$ at room temperature in a stream of nitrogen. Subsequently, into the autoclave was charged 750 g of liquid propylene. Hydrogen was then introduced into the autoclave in an amount such that the hydrogen concentration in the gas phase at 70° C. reached 13 mol-%. The reaction mixture was then heated to 70° C. with stirring. When the temperature of the reaction mixture reached 70° C., the solid catalyst component which had been treated with triethyl aluminum at (2) above was then added to the reaction mixture as a solid catalyst component in an amount of 11.6 mg to initiate polymerization. After 1 hour of polymerization at 70° C., the excessive propylene was then purged to suspend the polymerization. The amount of the propylene polymer thus obtained was 505 g. The propylene polymer thus obtained was analyzed. As a result, MFR was found to be 118.5 (g/10 min). The propylene polymer was analyzed by $^{13}$C-NMR. As a result, 2,1-insertion and 1,3-insertion of propylene were not observed.

(4) Modification of Propylene Polymer

The following reaction was effected according to U. W. Suter et al., "J. Am. Chem. Soc.", 14, 528 (1981).

2.0 g of the propylene polymer obtained in (3) above was the measured out in a micro autoclave having a capacity of 50 ml. Subsequently, to the propylene polymer were added 8.0 ml of n-heptane and 0.5 g of Pd/C. The reaction mixture was then reacted at 320° C. under a hydrogen pressure of 5.0 MPa for 5 hours. After the termination of reaction, the catalyst was removed by filtration. The solvent was then removed from the residue under reduced pressure to obtain 2.0 g of a modified propylene polymer.

The polymer thus obtained was then analyzed. The following results were obtained.

Mw by GPC: 100,000

Peak derived from carbon atom in a methyl group in a propylene unit chain formed by head-to-tail bond by $^{13}$C-NMR: ratio of S$_5$ to S=17.5(%), 4+2S$_5$/S$_6$=7.0. 2,1-Insertion and 1,3-insertion of propylene were not observed in $^{13}$C-NMR.

Further, (S$_1$+S$_2$)/(S$_1$+S$_2$+S$_3$+0.5S$_4$) was 0.

(5) Evaluation of Physical Properties

The modified propylene polymer obtained in (4) above was evaluated for physical properties in the same manner as in (iv) of Example 1. The modified propylene polymer was dissolved in heptane at 98° C. and toluene at 25° C. to prepare 10 wt-% solutions. The modified propylene polymer exhibited a good solubility in all the solvents. No insoluble contents were present. The toluene solution thus obtained was then applied to an injected piece of a high crystallinity polypropylene MA3U produced by NIPPON POLYCHEM CO., LTD. (cleaned with isopropyl alcohol on the surface thereof)(coated amount: 6.7 g/m$^2$). The coated material was then treated at 90° C. for 30 minutes. The coat layer was so sticky that it could not be subjected to normal adhesion test.

Comparative Example 3

(1) Modification of Propylene Polymer

The reaction procedure of (4) of Comparative Example 2 was followed except that the reaction time was 0.7 hours.

The polymer thus obtained was then analyzed. The following results were obtained.

Mw by GPC: 110,000

Peak derived from carbon atom in a methyl group in a propylene unit chain formed by head-to-tail bond by $^{13}$C-NMR: ratio of S$_5$ to S=72.8(%), 4+2S$_5$/S$_6$=36.0. 2,1-Insertion and 1,3-insertion of propylene were not observed in $^{13}$C-NMR.

Further, (S1+S$_2$)/(S$_1$+S$_2$+S$_3$+0.5S$_4$) was 0.

(5) Evaluation of Physical Properties

The modified propylene polymer obtained in (1) above was evaluated for physical properties in the same manner as in (iv) of Example 1. In an attempt to prepare 10 wt-% solutions, the modified propylene polymer was dissolved in heptane at 98° C. and toluene at 25° C. However, dissolution was not made sufficiently. Insoluble particles were present. The toluene solution thus obtained was then applied to an injected piece of a high crystallinity polypropylene MA3U produced by NIPPON POLYCHEM CO., LTD. (cleaned with isopropyl alcohol on the surface thereof)(coated amount: 6.7 g/m$^2$). The coated material was then treated at 90° C. for 30 minutes. The coat layer thus formed was not smooth on the surface thereof due to the insoluble content and thus was not subjected to normal adhesion test.

While the invention has been described in detail and with reference to specific embodiments thereof, it will be apparent to one skilled in the art that various changes and modifications can be made therein without departing from the spirit and scope thereof.

This application is based on Japanese patent application filed on Aug. 24, 2001 (Japanese patent application No. 2001-255197) and Japanese patent application filed on Dec. 3, 2001 (Japanese patent application No. 2001-368785), the entire contents thereof being hereby incorporated by reference.

INDUSTRIAL APPLICABILITY

The use of the present invention makes it possible to provide a base material made of a propylene-based polymer free of halogen such as chlorine with a good adhesion and coatability free from stickiness. Further, the coat layer thus obtained has a good external appearance. Accordingly, the present invention has an industrially high value.

The invention claimed is:

1. A propylene-based polymer comprising a propylene represented by the following characteristics (1) to (3):
   (1) the weight-average molecular weight Mw is from not smaller than 5,000 to less than 1,000,000 as measured by GPC;
   (2) $^{13}$C-NMR peaks derived from the carbon atom in a methyl group in a propylene unit chain formed by head-to-tail bond are observed and, wherein when the chemical shift of the top of a peak assigned to a pentad represented by mmmm is 21.8 ppm, the ratio of the area $S_5$ of the peak having its top at 21.8 ppm to the total area S of peaks appearing within a range of from 19.8 ppm to 22.2 ppm is from not smaller than 10% to not greater than 60%, and, wherein when the area of a peak having its top at 21.5 to 21.6 ppm is $S_6$, the relationship $4+2S_5/S_6>5$ can be established; and
   (3) regio irregular units based on 2,1-inserted propylene monomer and/or 1,3-inserted propylene monomer are present in its main chain and the sum of the ratio of regio irregular units based on 2,1-insertion and 1,3-insertion to all propylene insertions is not smaller than 0.05%;
   wherein the propylene-based polymer has no melting point.

2. The propylene-based polymer as claimed in claim 1, wherein the propylene-based polymer is a propylene polymer or propylene-olefin copolymer.

3. The propylene-based polymer as claimed in claim 2, wherein the propylene-olefin copolymer is a copolymer of propylene and ethylene.

4. The propylene-based polymer as claimed in claim 1, having the following characteristic (4):
   (4) $^{13}$C-NMR peaks derived from the carbon atom in a methyl group in a propylene unit chain formed by head-to-tail bond are observed and, wherein when the chemical shift of the top of a peak assigned to a pentad represented by mmmm is 21.8 ppm and the integrated intensity of peaks appearing at from 24.5 ppm to 25.0 ppm, from 33.5 ppm to 34.2 ppm, from 14.2 ppm to 23.5 ppm and from 27.5 ppm to 28.0 ppm are $S_1$, $S_2$, $S_3$ and $S_4$, respectively, the following relationship can be established:

$0<(S_1+S_2)/(S_1+S_2+S_3+0.5S_4)<0.05$.

5. The propylene-based polymer as claimed in claim 3, wherein when the propylene unit is represented by P, the 2,1-inserted propylene unit is represented by $'P$ and the ethylene unit is represented by E, no partial structures represented by PEE, $'PEE$, EEE, EPE and $E'PE$ are present or the total ratio of the partial structures is not greater than 3% of that of all triads formed by P, $'P$ and E.

6. The propylene-based polymer as claimed in claim 1, wherein the weight-average molecular weight Mw is from not smaller than 5,000 to less than 200,000 as measured by GPC and the polymer is a polymer comprising propylene as a monomer.

7. The propylene-based polymer as claimed in claim 1, wherein both the regio irregular units based 2,1-inserted propylene monomer and 1,3-inserted propylene monomer are present in the main chain.

8. The propylene-based polymer as claimed in claim 1, wherein both the regio irregular units based 2,1-inserted propylene monomer and 1,3-inserted propylene monomer are present in the main chain and the ratio of said regio irregular units based on 1,3-insertion to all propylene insertions is greater than the ratio of said regio irregular units based on 2,1-insertion to all propylene insertions.

9. The propylene-based polymer as claimed in claim 1, which is produced in the presence of a single site catalyst.

10. The propylene-based polymer as claimed in claim 9, wherein the single site catalyst is a $C_1$-symmetrical ansametallocene compound containing a transition metal and having a bridging group.

11. The propylene-based polymer as claimed in claim 10, wherein the transition metal is titanium, zirconium or hafnium.

12. The propylene-based polymer as claimed in claim 1, comprising an insoluble content of not greater than 1% by weight as dissolved in heptane at 98° C. in a concentration of 10% by weight.

13. The propylene-based polymer as claimed in claim 1, comprising an insoluble content of not greater than 1% by weight as dissolved in toluene at 25° C. in a concentration of 10% by weight.

14. A polypropylene-based polymer aqueous dispersion, which comprises:
   the polypropylene-based polymer as claimed in claim 1 and
   an aqueous solvent.

15. A method, which comprises:
   applying the polypropylene-based polymer aqueous dispersion as claimed in claim 14 to a molded product.

16. A molded product, which comprises:
   the polypropylene-based polymer as claimed in claim 1 and
   a base material.

17. The molded product as claimed in claim 16, wherein the base material is selected from the group consisting of an α-olefin polymer and an α-olefin copolymer.

18. The molded product as claimed in claim 16, wherein the base material is a material selected from the group consisting of polyethylene, middle-low pressure polyethylene, polypropylene, poly-4-methyl-1-pentene, poly-1-butene and polystyrene.

19. The molded product as claimed in claim 16, wherein the base material is a material selected from the group consisting of an ethylene-propylene copolymer, an ethylene-butene copolymer, and a propylene-butene copolymer.

* * * * *